United States Patent
Plourde et al.

(10) Patent No.: US 12,486,990 B2
(45) Date of Patent: Dec. 2, 2025

(54) SOLAR HEATING FOR REFRIGERATION AND FLUID HEATING DEVICES

(71) Applicant: LEMA Inc., St. Paul, MN (US)

(72) Inventors: Brian Plourde, St. Paul, MN (US);
Andrew Gikling, St. Paul, MN (US);
John Abraham, Minneapolis, MN (US); Richard Pakonen, Birchwood, MN (US); Douglas Plourde, Somerset, WI (US)

(73) Assignee: LEMA Inc., St. Paul, MN (US)

( * ) Notice: Subject to any disclaimer, the term of this patent is extended or adjusted under 35 U.S.C. 154(b) by 0 days.

(21) Appl. No.: 18/732,376

(22) Filed: Jun. 3, 2024

(65) Prior Publication Data
US 2024/0318842 A1    Sep. 26, 2024

Related U.S. Application Data

(62) Division of application No. 15/923,259, filed on Mar. 16, 2018, now abandoned.
(Continued)

(51) Int. Cl.
*F25B 27/00* (2006.01)
*F24D 3/00* (2022.01)
(Continued)

(52) U.S. Cl.
CPC ............ *F24F 5/0046* (2013.01); *F24D 3/005* (2013.01); *F24D 11/003* (2013.01);
(Continued)

(58) Field of Classification Search
CPC ....... F25B 27/007; F25B 27/002; F24S 50/40; F24F 2005/0067; F24F 30/45; F24F 10/70
See application file for complete search history.

(56) References Cited

U.S. PATENT DOCUMENTS 3,985,119 A * 10/1976 Oakes, Jr. ............. F24S 30/452
126/634
4,098,264 A * 7/1978 Brokaw ................ G01S 3/7861
126/694
(Continued)

FOREIGN PATENT DOCUMENTS

BR   112019019041   1/2024
PE     001878-2019   6/2024

OTHER PUBLICATIONS

"Peruvian Application Serial No. 001878-2019, Respone Filed Mar. 1, 2024 to Office Action mailed Jan. 12, 2024", W English Claims, 8 pgs.
(Continued)

*Primary Examiner* — David J Teitelbaum
(74) *Attorney, Agent, or Firm* — Schwegman Lundberg & Woessner, P.A.

(57) ABSTRACT

A fluid-based system for use in heating and/or cooling. In particular, the system may have a fluid heating device, which may be a solar fluid heating device, configured to heat a fluid. Heat from the heated fluid may be transferred to one or more cooling subsystems or heating subsystems. A cooling subsystem may be an absorption cooling subsystem, for example, wherein heat may cause phase change of a refrigerant. A heating subsystem may include a storage tank through which heated fluid may be circulated to heat the storage tank. A system of the present disclosure may include multiple cooling and/or heating subsystems for cooling and or heating a variety of different environments, objects, or materials.

8 Claims, 15 Drawing Sheets

Related U.S. Application Data

(60) Provisional application No. 62/472,030, filed on Mar. 16, 2017.

(51) Int. Cl.
| | |
|---|---|
| *F24D 11/00* | (2022.01) |
| *F24D 17/00* | (2022.01) |
| *F24F 5/00* | (2006.01) |
| *F24S 20/40* | (2018.01) |
| *F24S 23/70* | (2018.01) |
| *F24S 23/74* | (2018.01) |
| *F24S 30/452* | (2018.01) |
| *F24S 90/00* | (2018.01) |
| *F28D 20/00* | (2006.01) |

(52) U.S. Cl.
CPC ..... *F24D 17/0021* (2013.01); *F24D 17/0063* (2013.01); *F24S 20/40* (2018.05); *F24S 23/70* (2018.05); *F24S 23/74* (2018.05); *F24S 30/452* (2018.05); *F24S 90/00* (2018.05); *F25B 27/002* (2013.01); *F25B 27/007* (2013.01); *F28D 20/0034* (2013.01); *F24D 2200/02* (2013.01); *F24D 2200/126* (2013.01); *F24D 2200/14* (2013.01); *F24F 2005/0064* (2013.01); *F24F 2005/0067* (2013.01); *F28D 2020/0078* (2013.01); *Y02A 30/27* (2018.01); *Y02A 30/272* (2018.01); *Y02B 10/20* (2013.01); *Y02B 10/70* (2013.01); *Y02B 30/62* (2013.01); *Y02E 10/40* (2013.01); *Y02E 10/47* (2013.01); *Y02E 60/14* (2013.01); *Y02E 70/30* (2013.01)

(56) References Cited

U.S. PATENT DOCUMENTS

| | | | | |
|---|---|---|---|---|
| 4,172,739 | A | * | 10/1979 | Tassen ............... H02S 20/32 353/3 |
| 4,285,211 | A | * | 8/1981 | Clark ............... F25B 25/02 62/235.1 |
| 4,469,938 | A | * | 9/1984 | Cohen ............... G01S 3/7861 126/696 |
| 10,208,984 | B2 | * | 2/2019 | Abdel-Hady ........... F24S 40/20 |
| 2009/0032090 | A1 | * | 2/2009 | Kats ............... H02S 20/32 136/251 |
| 2011/0308512 | A1 | * | 12/2011 | Nakasato ............... F24S 50/20 126/694 |

OTHER PUBLICATIONS

"Indian Application Serial No. 201937039214, Hearing Notice mailed Jun. 12, 2024", 3 pgs.
"Indian Application Serial No. 201937039214, Hearing Notice mailed Jul. 1, 2024", 3 pgs.
"Indian Application Serial No. 201937039214, Response Filed Aug. 14, 2024 to Hearing Notice mailed Jul. 1, 2024", 17 pgs.
"Indian Application Serial No. 201937039214, Refusal Rejection mailed Sep. 20, 2024", 23 pgs.

* cited by examiner

SOLAR HEATING FOR REFRIGERATION AND FLUID HEATING DEVICES

CROSS-REFERENCE TO RELATED APPLICATIONS

The present disclosure is a continuation of U.S. patent application Ser. No. 15/923,259, filed Mar. 16, 2018 which claims priority to Provisional Application No. 62/472,030, entitled Solar Heating for Refrigeration and Fluid heating devices, and filed Mar. 16, 2017, the content each of which are hereby incorporated by reference herein in their entirety.

In addition, the present application is related to U.S. Provisional Application No. 62/085,699 filed on Dec. 1, 2014, entitled Mathematical Model for the Inactivation of Biological Contaminants using Solar Heating; U.S. Provisional Application No. 62/259,748, filed on Nov. 25, 2015, entitled Fluid Heating System; U.S. Non-Provisional application Ser. No. 14/954,091, filed Nov. 30, 2015, entitled Dual Axis Tracking Device; U.S. Non-Provisional application Ser. No. 14/954,292, filed Nov. 30, 2015, entitled Fluid Heating System; U.S. Non-Provisional application Ser. No. 14/954,318, filed Nov. 30, 2015, entitled Control Valve Assembly for Fluid Heating System; U.S. Non-Provisional application Ser. No. 14/954,383, filed Nov. 30, 2015, entitled Method of Calculating Pathogen Inactivation for a Fluid Heating System; and U.S. Non-Provisional application Ser. No. 15/818,052, filed Nov. 20, 2017, entitled Digital Fluid Heating System, the contents of each of which are hereby incorporated by reference herein in their entirety.

FIELD OF THE INVENTION

The present disclosure relates to thermal heating and cooling systems and methods and associated mechanisms and devices. Particularly, the present application relates to fluid-based thermal heating and cooling systems and methods for providing heat and/or cooling. More particularly, the present application relates to thermal heating and cooling systems and methods operated by selected circulation of a heated fluid.

BACKGROUND OF THE INVENTION

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In general, an energy source is needed to produce heat or refrigeration. Electrical energy sources may be relatively expensive and/or inaccessible in rural or remote areas. Other energy sources such as coal, wood, natural gas, propane, and other fuels may also be relatively costly to implement and/or may produce undesirable or hazardous emissions. Some energy sources may additionally be relatively inefficient and/or may produce relatively inconsistent heating or cooling.

Additionally, there are many situations where heating of fluids (liquids or gases) is beneficial. Heating liquid water can be used for pasteurization, cooking, creating steam for power generation, heating, manufacturing, providing indoor comfort, or other applications.

BRIEF SUMMARY OF THE INVENTION

The following presents a simplified summary of one or more embodiments of the present disclosure in order to provide a basic understanding of such embodiments. This summary is not an extensive overview of all contemplated embodiments, and is intended to neither identify key or critical elements of all embodiments, nor delineate the scope of any or all embodiments.

The present disclosure, in one or more embodiments, relates to a thermal fluid system having a fluid heating device configured to heat a fluid circulating therethrough. The thermal fluid system may additionally have a heating subsystem configured to provide heat by circulation of heated fluid from the fluid heating device therethrough. Additionally or alternatively, the thermal fluid system may have a cooling subsystem configured to provide refrigeration, wherein at least a portion of the cooling subsystem is powered by heated fluid from the fluid heating device. In some embodiments, the fluid heating device may be a solar fluid heating device. The system may additionally have a control valve for directing heated fluid to the heating subsystem and/or cooling subsystem. The cooling subsystem may include an absorption system. Moreover, the cooling subsystem may have a refrigerant-absorbent fluid mixture, and a generator configured for separating the refrigerant from the absorbent. The generator may include the fluid heating device in some embodiments. In some embodiments, the fluid heated by the fluid heating device may include one or more oils, one or more brine mixtures (such as a salt water mixture), glycol, liquid ammonia, and/or other thermal fluids. In some embodiments, a thermal fluid may be a relatively environmentally safe or environmentally conscious fluid. The heating subsystem may include a storage tank, and a pipe configured to carry heated fluid from the fluid heating device through the storage tank to heat the interior of the storage tank. In some embodiments, the thermal fluid system may have a solar electric device for collecting and/or storing solar energy. For example, solar energy may be collected and stored in one or more batteries. Stored solar electric energy may be used to power an additional heating device, such as a resistance heater, and/or other electrical components of the system.

The present disclosure, in one or more embodiments, additionally relates to a control system for a thermal fluid heating system. The control system may have a controller configured to direct flow of a heated fluid from a fluid heating device to one or more thermal subsystems, which may include one or more heating subsystems and/or one or more cooling subsystem. The heating subsystem may be configured to provide heat by circulation of the heated fluid from the fluid heating device through the heating subsystem. The cooling subsystem may be configured to provide refrigeration, wherein at least a portion of the cooling subsystem is powered by the heated fluid from the fluid heating device. The control system may additionally have a temperature sensor communicably coupled to the controller over a network and arranged in the heating subsystem or the cooling subsystem. The control system may additionally have a control valve communicably coupled to the controller over a network, the control valve operable by the controller and configured to control the flow of fluid to the heating subsystem or the cooling subsystem. In some embodiments, the controller may additionally be configured to receive a user input regarding a desired temperature for the heating subsystem and/or cooling subsystem. The controller may be configured to operate the control valve based on the user input and a temperature sensed by the temperature sensor. The control system may have a database storing sensed temperature data and user inputs in some embodiments. The control system may include a user device communicably coupled to the controller over a network and configured to transmit user inputs to the controller. The control system may include at least one additional sensor, which may be a temperature sensor, flow sensor, or a pressure sensor. Moreover, the controller may be configured to operate the control valve based on sensed temperature data, flow data, and/or pressure data. In some embodiments, the controller may be configured to direct flow of a heated fluid to two or more thermal subsystems. Moreover, upon an interruption of power to the fluid heating device, the controller may be configured to prioritize a first thermal subsystem.

The present disclosure, in one or more embodiments, additionally relates to a method of heating and cooling. The method may include directing fluid through a fluid heating device to heat the fluid, and operating a control valve to direct the heated fluid to a heating subsystem and/or a cooling subsystem. The heating subsystem may provide heat by circulation of the heated fluid from the heating device through the heating subsystem. The cooling subsystem may be configured to provide refrigeration, wherein at least a portion of the cooling subsystem is powered by the heated fluid from the fluid heating device. In some embodiments, the method may include receiving a user input regarding a desired temperature for the heating subsystem and/or cooling subsystem. In some embodiments, the fluid heating device may be a solar fluid heating device.

While multiple embodiments are disclosed, still other embodiments of the present disclosure will become apparent to those skilled in the art from the following detailed description, which shows and describes illustrative embodiments of the invention. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the various embodiments of the present disclosure, it is believed that the invention will be better understood from the following description taken in conjunction with the accompanying Figures, in which:

DETAILED DESCRIPTION

The present disclosure, in some embodiments, relates to a fluid-based system for use in heating and/or cooling. In particular, the system may have a fluid heating device, which may be a solar fluid heating device, such as a solar collector configured to heat a fluid. Heat from the heated fluid may be transferred to one or more cooling subsystems or heating subsystems. A cooling subsystem may be an absorbent refrigeration subsystem, for example, wherein heat may cause phase change of a refrigerant. A heating subsystem may include a storage tank through which heated fluid may be circulated to heat the storage tank. Some examples of cooling subsystems include, but are not limited to, an air conditioning system for a dwelling, or a food storage refrigerator or freezer. Some examples of a heating subsystem may include, but are not limited to, a heating system for a dwelling, a hot water tank for use in a dwelling, or a radiant floor heating system. A system of the present disclosure may include multiple cooling and/or heating subsystems for cooling and or heating a variety of different environments, objects, or materials.

The systems, device, and mechanisms described herein may allow for thermal heating and/or refrigeration in remote areas of the world or in conditions of power loss, catastrophic event, war, or other situations where other energy sources may be relatively unavailable or inaccessible. Systems of the present disclosure may provide such heating and/or refrigeration automatically, with little to no human interaction and little to no reliance on public utilities, networks, or other utility, electrical, information, or other infrastructure. However, in some embodiments, systems may be equipped with an onboard computer allowing for user communication and interaction on an as-needed and/or as-desired basis. For example, a system may be configured for wireless or wired connection to a user's smartphone or computer using wireless connections and allowing for user interaction with the system. The wireless connection may enable access, monitoring, calibration of control algorithms, and/or management of the system remotely. Consequently, the operation and management of a system of the present disclosure may have reduced costs compared to other systems requiring regular on site interaction with users.

Figure 1:
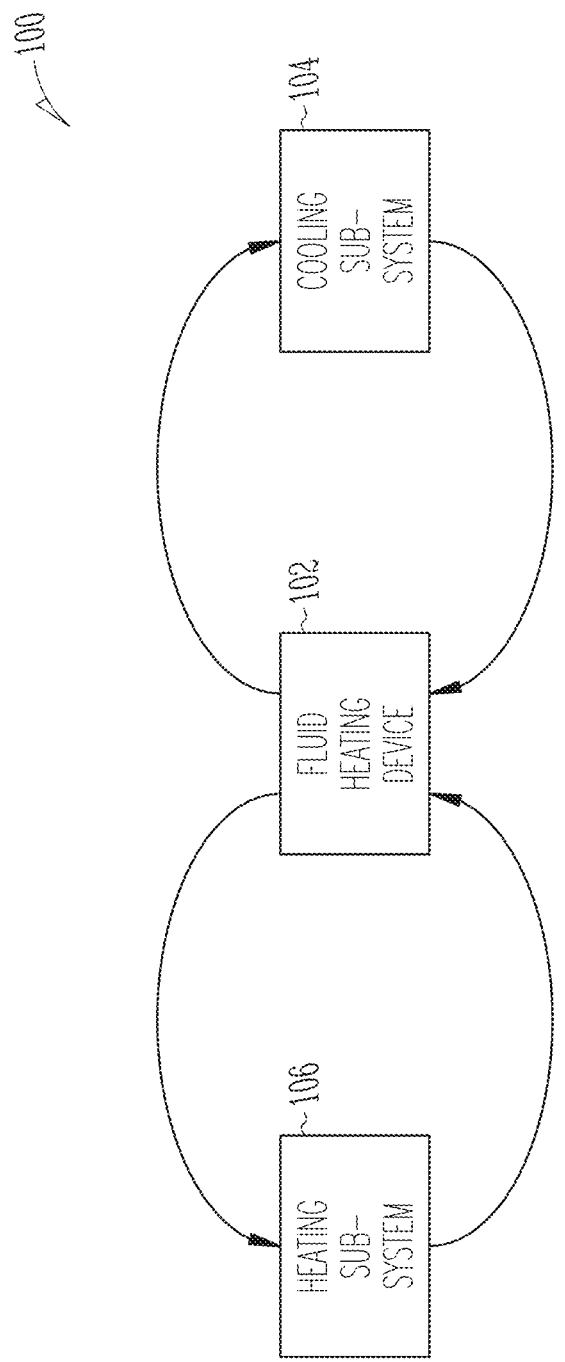
FIG. 1 is a conceptual diagram of a thermal system of the present disclosure, according to one or more embodiments.

Turning now to FIG. 1, a heating and cooling system 100 of the present disclosure is shown, according to one or more embodiments. As shown, the system 100 may generally have a fluid heating device 102 configured for heating one or more fluids. The system 100 may additionally have a refrigeration or cooling subsystem 104 configured for cooling an environment, object, or material. The system 100 may additionally have a heating subsystem 106, which may be configured for heating an environment, object, or material. A fluid may enter the fluid heating device 102 for heating. After being heated by the fluid heating device 102, the heated fluid may be directed to the cooling subsystem 104 for generating a cooling or refrigeration process, such as an absorption cooling or compression cooling process. Additionally or alternatively, heated fluid from the fluid heating device 102 may be directed to the heating subsystem 106 for transferring heat to an area, object, or material. For example, the heating subsystem 106 may include a fluid storage tank, such as a hot water tank, which may be heated by circulation of the heated fluid around, beneath, or through the storage tank. In other embodiments, the heated fluid may be stored in the tank for later or ongoing use. In some embodiments, heated fluid directed to the cooling 104 and/or heating 106 subsystems may be recirculated back to the fluid heating device 102 to be reheated.

Figure 2:
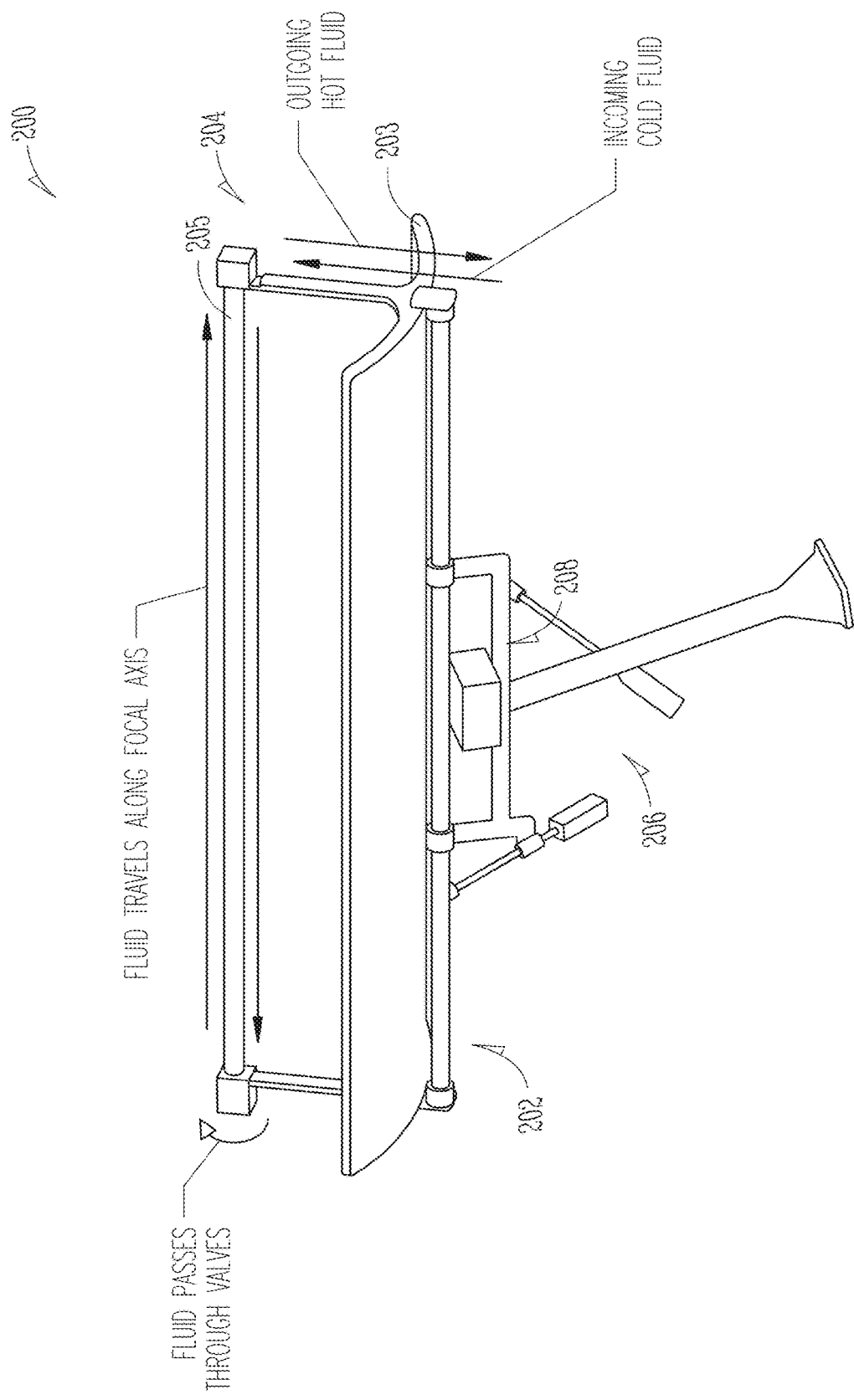
FIG. 2 is a perspective view of a fluid heating device of the present disclosure, according to one or more embodiments.

In some embodiments, the fluid heating device 102 may be a solar-based fluid heating device, configured to direct solar energy to increase the temperature of a fluid. FIG. 2 shows one embodiment of a solar-based fluid heating device 200. The fluid heating device 200 may generally have a solar collection system 202 with an elongate parabolic mirror 203 or other reflective element configured to focus sunlight on a focal axis. A fluid heating tube 205 may be arranged along the mirror 203 and along the focal axis. Using a fluid control system 204, water or another fluid may be controllably passed through the heating tube 205 at a calibrated rate, dependent upon time and temperature, to heat the fluid. Fluid flow may be controlled by one or more valves, which may be thermally or digitally actuated valves in some embodiments. A support structure 206 may support the solar collection system 202 and/or portions of the fluid control system 204. The fluid heating device 200 may additionally have a solar tracking system 208 configured for manipulating the support structure 206, or portions thereof, thereby adjusting the position and orientation of the solar collection system 202 and one or more portions of the fluid control system 204 in a manner that allows for efficient collection of solar energy and efficient heating of fluid. In some embodiments, the tracking system 208 may be a dual-axis tracking system. In some embodiments, the fluid heating device 200 may be similar to that described in U.S. Non-Provisional application Ser. No. 15/818,052, entitled Digital Fluid Heating System, previously incorporated by reference herein, or may include components described in, or similar to components described in, that application.

The tracking system may include a dual axis tracking system configured for directing the solar collection system at the sun. The dual axis tracking system may be configured to pivot the solar collection system about two axes. The system may also include a support structure including an upright support member, an arm portion extending laterally from the upright support member, and a spine portion offset from the arm portion and extending substantially parallel to the arm portion. The arm portion may be pivotable about a seasonal axis extending perpendicular to the upright support member and perpendicular to the arm portion. The spine portion may be pivotable about a day axis extending longitudinally along the spine portion. The system may also include two actuation assemblies for pivoting the solar collection system about the seasonal and day axes.

In one or more embodiments, a method of operating a fluid heating system wherein the fluid heating system comprises a parabolic solar collector and a support structure may be provided. The method may include arranging the fluid heating system along a North/South axis on the surface of the earth and directing the parabolic solar collector at a sun. Directing the parabolic solar collector may include activating a control module comprising a GPS communication device, wherein the control module receives GPS data from satellites including coordinate data defining the location of the fluid heating system on the surface of a planet, date data, and time data and automatically directs the solar collector at a sun. Automatically directing the solar collector at the sun may include pivoting the solar collector about a day axis and a seasonal axis. The seasonal axis may be a substantially horizontal axis relative to the surface of the planet. The day axis may be an axis arranged substantially parallel to a longitudinal length of the solar collector.

The fluid heating device 200 may have one or more controllers, processors, or other computer components controlling fluid treating operations and solar tracking operations. The one or more controllers or other computer components may be configured to track movement of the sun or other object across the sky, and use one or more motors and/or actuators to direct the solar collection system 202 toward the position of the sun in order to collect and direct solar energy toward the fluid heating tube 205. Additionally, the one or more controllers or other computer components may be configured to direct flow of the fluid through the fluid heating tube 205 as needed to heat the fluid to a desired or suitable temperature. As described in U.S. Non-Provisional application Ser. No. 15/818,052, previously incorporated by reference herein, the fluid heating device may operate relatively autonomously in some embodiments, using solar energy to heat fluid, and storing heated fluid, as needed. In some embodiments, the fluid heating device may operate based upon user input.

The fluid heating device 200 may operate to heat any suitable fluid. For example, where the fluid may ultimately be used for drinking, cooking, or personal use, the fluid heating device may operate to heat water. In other embodiments, a fluid may be selected based upon a variety of properties, such as boiling temperature, viscosity, and ability to retain or transfer heat. In some embodiments, a fluid with a relatively high boiling temperature may be heated using the fluid heating device, so as to avoid undesired vaporization of the fluid. In some embodiments, the fluid may be or include one or more oils, one or more brine mixtures (such as a salt water mixture), glycol, liquid ammonia, and/or other thermal fluids. In some embodiments, a thermal fluid may be a relatively environmentally safe or environmentally conscious fluid. The fluid heating device 200 may have a storage container for storing the fluid when not actively being heated or circulated for use.

While a solar-based fluid heating device is shown and described, in other embodiments, other fluid heating devices using other energy sources may be used. For example, other fluid heating devices may use electric power, propane, wood, wind, geothermal, or other energy sources.

Figure 3:
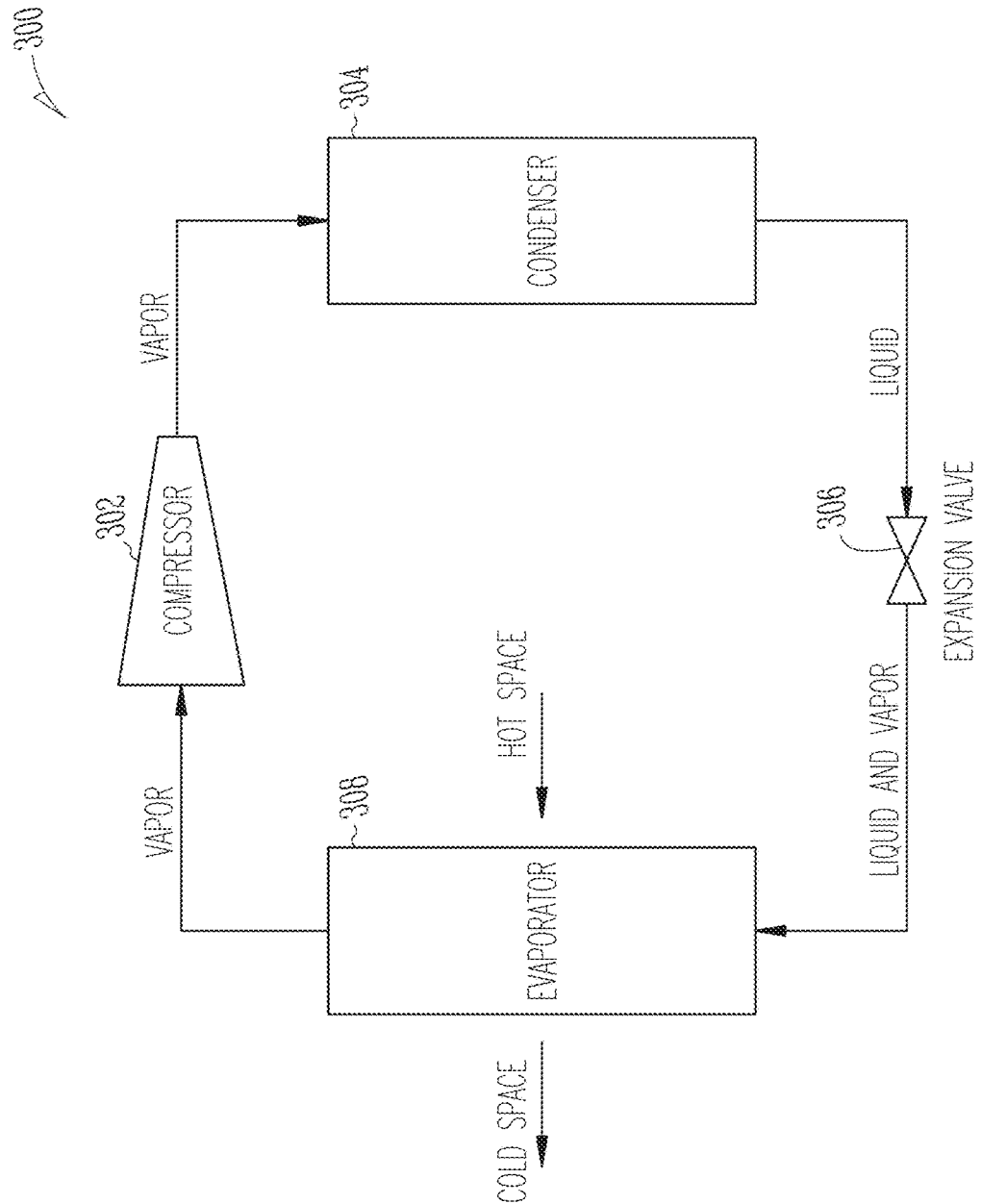
FIG. 3 is a conceptual diagram of a compression cooling subsystem of the present disclosure, according to one or more embodiments.

Referring back to FIG. 1, the cooling subsystem 104 may be, for example, an absorption refrigeration system or other fluid-based refrigeration system. However, additionally or alternatively, other cooling or refrigeration systems may be used. In general, the cooling subsystem 104, or a portion thereof, may be operable using a heat source, such as using heated fluid circulated to the cooling subsystem from the fluid heating device 102. In some embodiments, the cooling subsystem 104 may be or include a compression cooling system, where for example, an energy source is available to power a compressor. One example of a compression cooling system 300 is shown in FIG. 3. The system 300 may include a compressor 302, condenser 304, expansion valve 306, and evaporator 308. A refrigerant fluid may be circulated through the system through different phase states to cause a cooling effect. The refrigerant fluid may be or include ammonia, sulfur dioxide, propane, one or more fluorocarbons or chlorofluorocarbons, and/or other refrigerant fluids. The refrigerant fluid may enter the compressor 302 as a relatively low-pressure vapor. The compressor 302 may compress the fluid to a relatively high-pressure vapor. The fluid may then pass through the condenser 304, where it may change phase to a liquid while maintaining a relatively high pressure. The fluid may then pass through the expansion valve 306, where it may experience a reduction in pressure. The reduction in pressure may cause a flash evaporation of all or part of the refrigerant, which may lower the temperature of the fluid. The fluid may then pass into the evaporator 308, where it may absorb and remove heat from the surrounding air. The refrigerant may transform into vapor in the evaporator 308, before it is routed back through the compressor 302.

Figure 4:
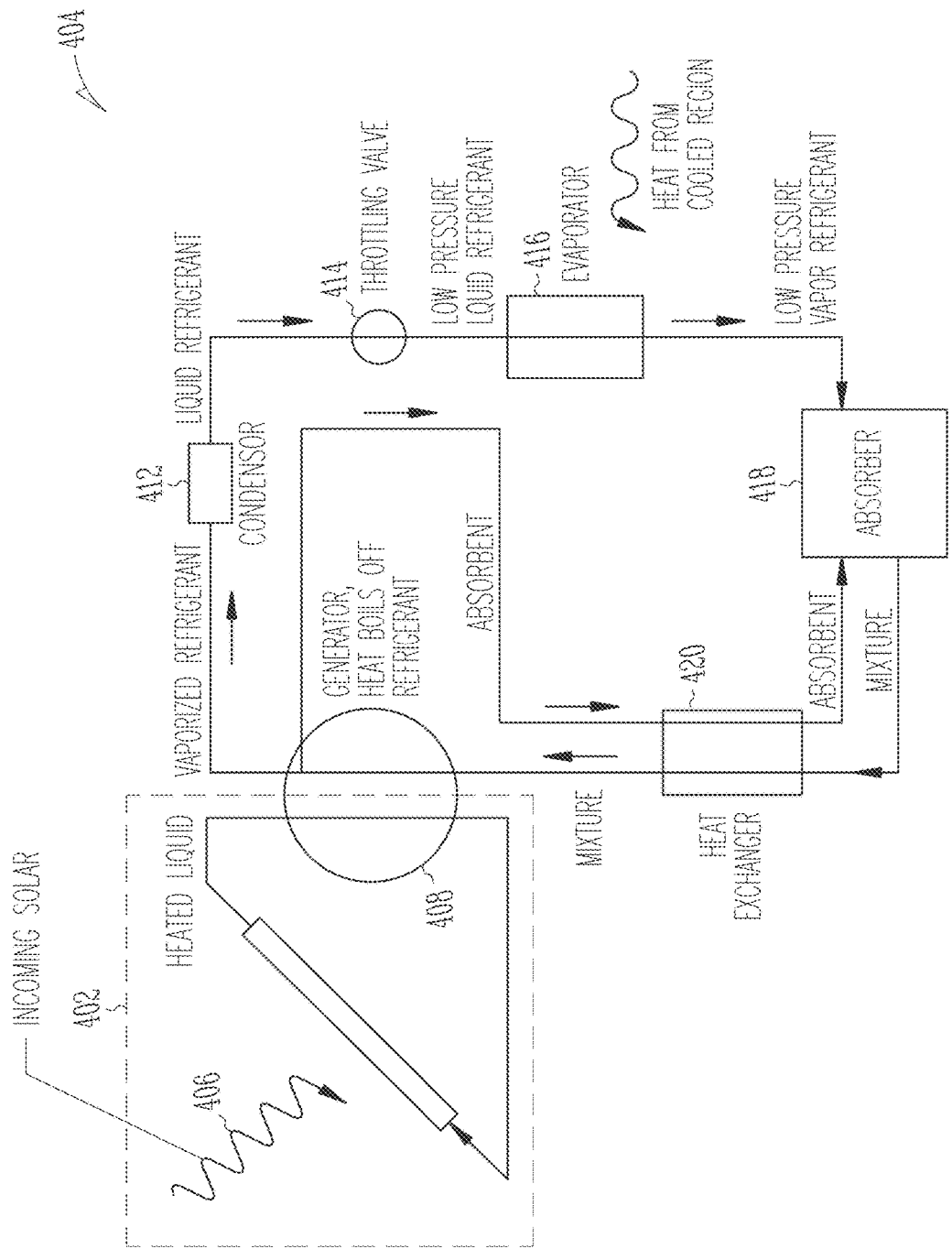
FIG. 4 is a conceptual diagram of a thermal system having a fluid heating device and cooling subsystem of the present disclosure, according to one or more embodiments.

Alternatively, in some embodiments, an absorption cooling system may be used. In this way, two or more fluids having different boiling temperatures may be used in combination, and may be separated by applying heat. FIG. 4 shows one embodiment of another cooling subsystem 404 of the present disclosure, which may be used in conjunction with a fluid heating device 402 of the present disclosure. As shown, the fluid heating device 402 may be a solar-based device using solar energy 406 to heat a circulated fluid, as described above. The fluid heating device 402 may be a closed-loop system. Fluid from the fluid heating device 402 may be routed through, or through a portion of, the cooling subsystem 404 to provide heat to a refrigerant fluid within the cooling subsystem. For example, heated fluid from the fluid heating device 402 may be circulated through a generator 408 of the cooling subsystem 404, as will be described in more detail below.

The cooling subsystem 404 may be or include an absorption cooling system, wherein one or more, or two or more, fluids are circulated through a plurality of components. The cooling subsystem may generally have a generator 408, a condenser 412, a throttling valve 414, an evaporator 416, an absorber 418, and a heat exchanger 420. The cooling subsystem 404 may be configured to provide cooling or refrigeration for an environment, object, or material. For example, the cooling subsystem 404 may be used to cool a room or dwelling, food storage enclosure, or other storage enclosure. In some embodiments, the cooling subsystem 404 may be used to cool a material, such as water stored in a water tank.

The cooling subsystem 404 may be a closed-loop system wherein one or more fluids are circulated through the various components. In at least one embodiment, a mixture of two fluids, a refrigerant and an absorbent, may be circulated through the cooling subsystem 404. The refrigerant may have a lower boiling temperature than the absorbent. The refrigerant may be or include ammonia, sulfur dioxide, propane, or another refrigerant. The absorbent may be or include a salt solution or other suitable absorbent. The cooling subsystem 404 may be configured to heat the circulated fluid(s) to cause vaporization of the refrigerant. For example, where the fluid includes a refrigerant-absorbent mixture, the cooling subsystem 404 may be configured to heat the mixture to separate the two fluids by causing the refrigerant to vaporize.

In the cooling subsystem 404, the refrigerant-absorbent mixture may be routed, as a liquid, through the generator 408, where it may be heated. The generator 408 may be configured to separate the refrigerant from the absorbent. For example, the generator 408 may be a fluid-to-fluid heat exchanger, wherein heated fluid from the fluid heating device 402 may pass through the generator to heat the liquid refrigerant-absorbent mixture. The generator 408 may heat the refrigerant-absorbent mixture until it reaches or exceeds the boiling temperature of the refrigerant, causing the refrigerant or a portion thereof to vaporize out of the mixture. After separation from the refrigerant at the generator 408, the liquid absorbent may be routed to the absorber 418. The vaporized refrigerant may be routed to the condenser 412, where it may lose heat to the environment and reconvert to a liquid. The liquid refrigerant may be passed through the throttling valve 414, which may cause a drop in pressure. The reduction in pressure may cause a flash evaporation of all or part of the refrigerant, which may lower the temperature of the fluid. With a relatively low pressure, the cooled liquid refrigerant may enter the evaporator 416, where it may absorb and remove heat from the surrounding air. The refrigerant may transform into a vapor in the evaporator 416. In some embodiments, the evaporator 416 itself may be or include the region to be cooled by the cooling subsystem 404. For example, the evaporator 416 may be or include a food storage or other storage container or area. In other embodiments, the evaporator 416 may be configured to route the vaporized refrigerant, via one or more coils for example, through, around, or proximate to a space or object to be cooled, such as a dwelling space or other environment or object. Upon leaving the evaporator 416, the vaporized refrigerant may be routed to the absorber 418, where it may be reabsorbed as a liquid by the absorbent. The recombined liquid refrigerant-absorbent mixture may be directed back to the generator 408 to repeat the separation and cooling processes. In some embodiments, a heat exchanger 420 may be flowably arranged between the generator 408 and absorber 418. After separation from refrigerant, absorbent (which may still be heated from the generator 408) may be directed from the generator, through the heat exchanger 420 before it reaches the absorber 418. Moreover, the refrigerant-absorbent mixture may be routed from the absorber 418, through the heat exchanger, before it reaches the generator 408. In this way, the refrigerant-absorbent mixture may be preheated by the heated absorbent before it reaches the generator 408.

Figure 5:
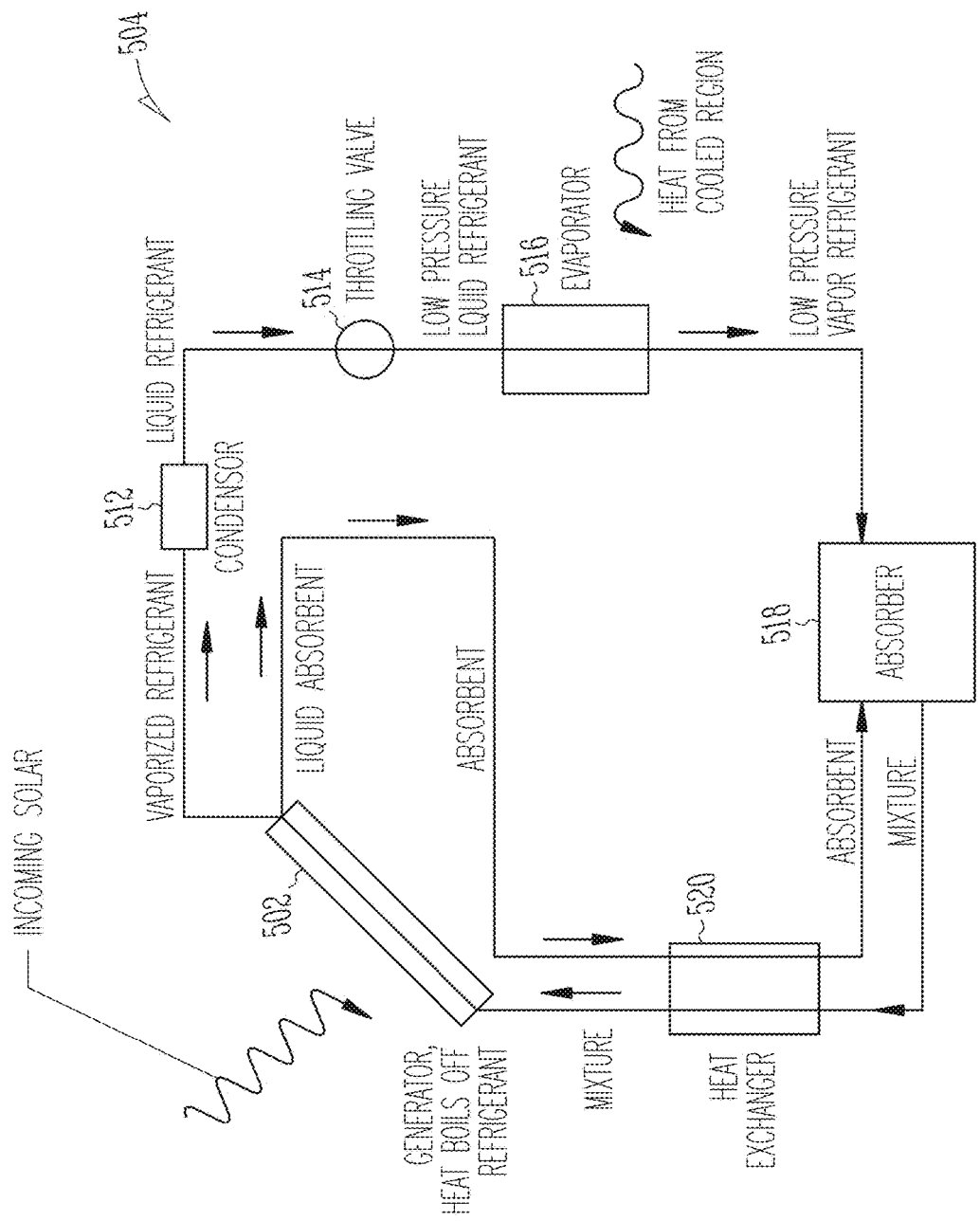
FIG. 5 is a conceptual diagram of another thermal system having a fluid heating device and cooling subsystem of the present disclosure, according to one or more embodiments.

In some embodiments, a fluid heating device of the present disclosure may be more integrally incorporated into a cooling subsystem, such that the fluid (or mixture) passing through the cooling system may itself be heated via the fluid heating device. As shown for example in FIG. 5, a fluid heating device 502 may be integrated with a cooling subsystem 504 of the present disclosure. The fluid heating device 502 may be a solar-based system as generally described above. The cooling subsystem 504 may have a condenser 512, throttling valve 514, evaporator 516, absorber 518, and heat exchanger 520, which may operate similarly to those discussed above with respect to FIG. 4. However, it is to be appreciated that in the embodiment of FIG. 5, the fluid heating device 502 may be used in place of, or used as, a generator to heat and thus separate a refrigerant-absorbent mixture. In this way, the liquid refrigerant-absorbent mixture may be passed through the fluid heating device 502 for heating. The mixture may be heated until it reaches or exceeds the boiling temperature of the refrigerant. In some embodiments, the mixture may be cycled through the fluid heating device 502 multiple times until it reaches or exceeds the desired temperature or temperature range. Upon reaching or exceeding the boiling temperature of the refrigerant, the refrigerant may vaporize, and be passed through the condenser 512, throttling valve 514, evaporator 516, and absorber 618, as described with respect to FIG. 4. The liquid absorbent may be passed to the absorber 518, optionally through a heat exchanger 520. In the absorber 518, the refrigerant may be absorbed as a liquid by the absorbent, and the mixture may be directed back to the fluid heating device 502, optionally through the heat exchanger 520, to repeat the separation and cooling processes. In this way, the fluid heating device 502 and cooling subsystem 504 may together form a single closed-loop system.

While particular cooling systems have been shown and described, other cooling systems may be used in other embodiments.

Figure 6:
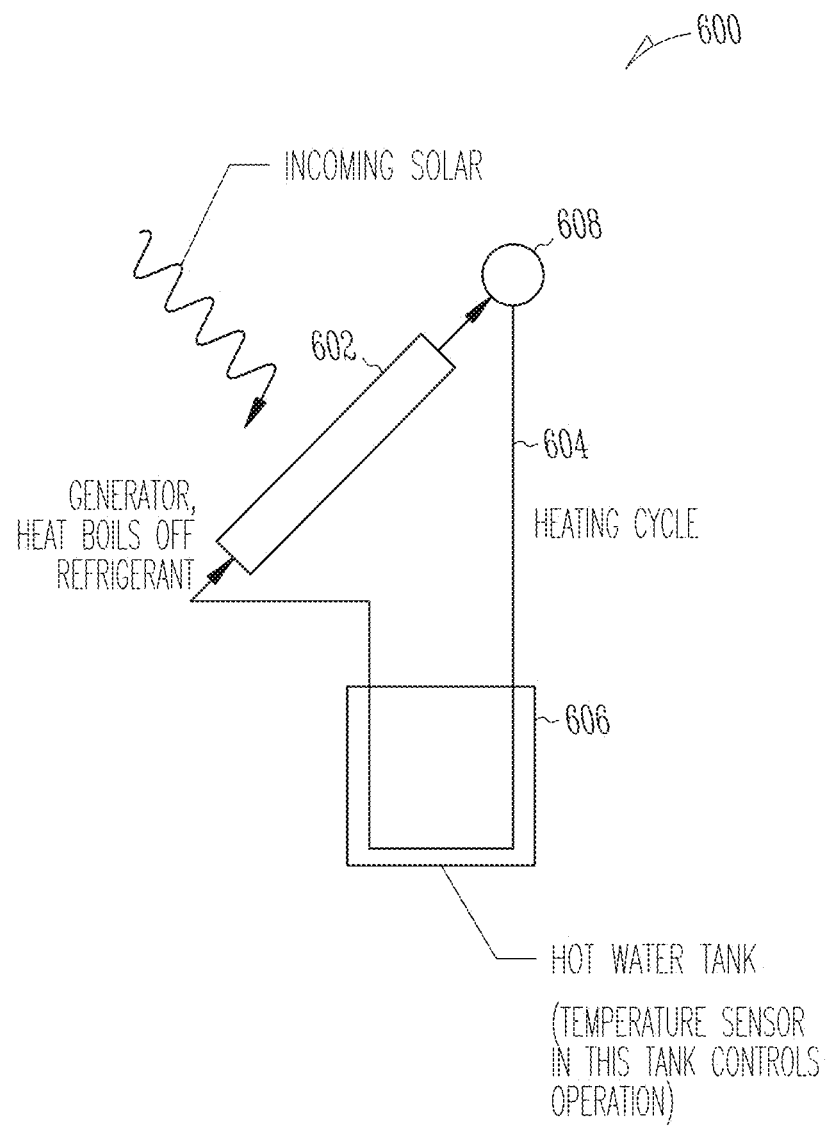
FIG. 6 is a conceptual diagram of a thermal system having a fluid heating device and a heating subsystem of the present disclosure, according to one or more embodiments.

As indicated above, in some embodiments, a system of the present disclosure may provide a heating subsystem in addition to, or alternative to, a cooling subsystem. For example, FIG. 6 shows one embodiment of a fluid heating device 602 in combination with a heating subsystem 604. The fluid heating device 602 may be a solar-based fluid heating device, as generally described above. The heating subsystem 604 may generally be configured to route a heated liquid through, around, or proximate to an area or object to be heated. For example, in some embodiments, the heating subsystem 604 may include a hot water tank 606 storing water (or another liquid) therein. Tubing or piping may be coiled through or around the hot water tank 606, such that heated fluid from the fluid heating device 602 may be routed through or around the water tank. Heat from the heated fluid may be transferred to water stored in the hot water tank 606, so as to increase its temperature. In some embodiments, heated fluid from the fluid heating device 602 may be cycled through the hot water tank 606 until water stored therein reaches a desired temperature or temperature range.

Figure 7:
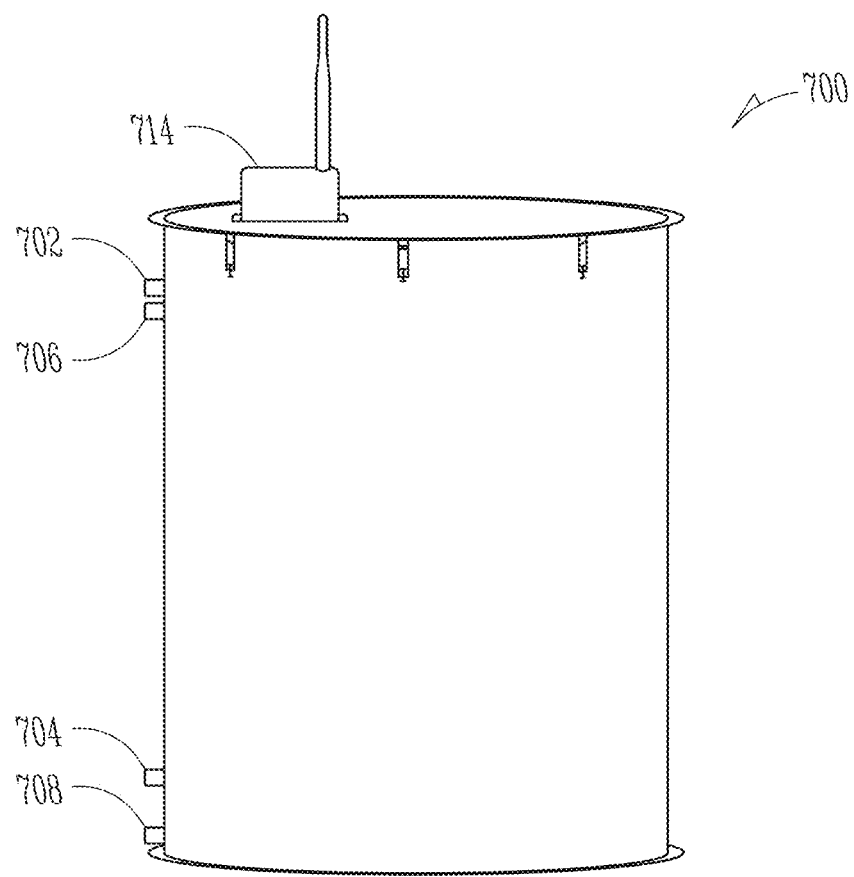
FIG. 7 is a side view of a heated fluid tank of the present disclosure, according to one or more embodiments.
Figure 8:
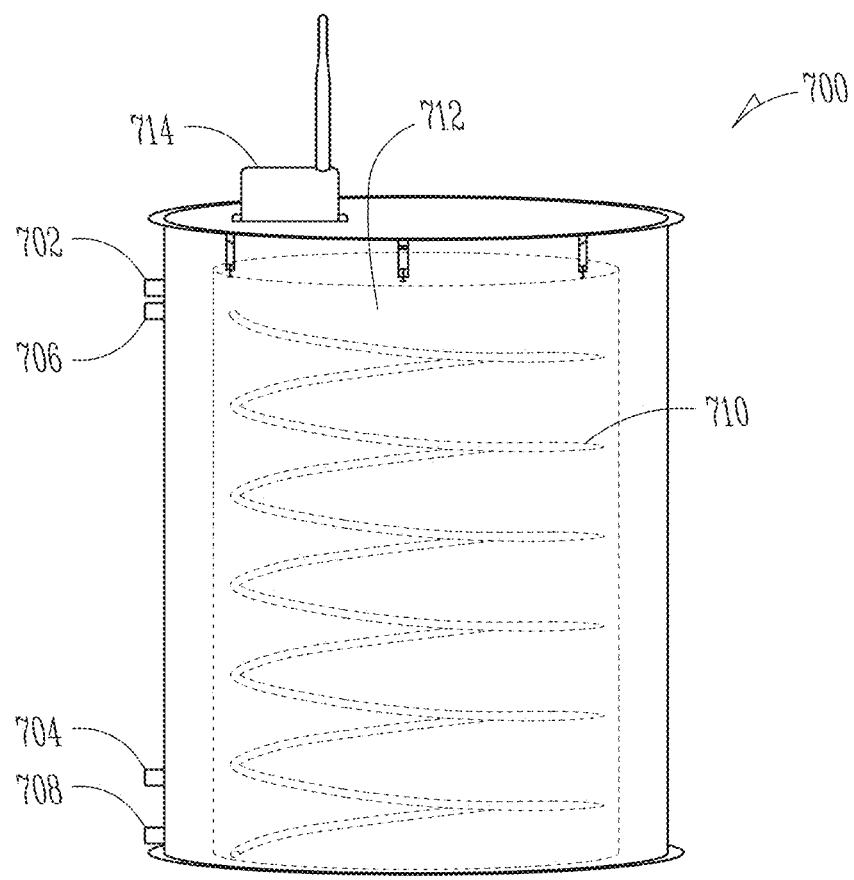
FIG. 8 is an internal side view of a heated fluid tank of the present disclosure, according to one or more embodiments.

FIGS. 7 and 8 show a storage tank 700, which may be a hot water tank, according to one or more embodiments. The storage tank 700 may have any suitable size and shape configured for storing a desired quantity of water or another fluid or material. The storage tank 700 may be constructed of any suitable materials, and in some embodiments, may be insulated to contain a heated fluid, for example. The storage tank 700 may have an inlet port 702 and outlet port 704 for the water or other fluid or material stored therein. The tank 700 may additionally have an inlet 706 and outlet 708 port through which heated fluid from a fluid heating device may be directed. As shown in FIG. 8, tubing or piping 710, which may be arranged in one or more coiled configurations, may be arranged within the storage tank 700. The piping 710 may be flowably arranged between the inlet 706 and the outlet 708, and may be configured to carry heated fluid from the fluid heating device through the storage tank 700. The piping 710 may generally be arranged so as to distribute heat from the heated fluid throughout the storage tank. For example, as shown in FIG. 8, the piping 710 may be arranged in a coil shape extending between a first and second end of the storage tank 700, and having relatively uniform spacing between loops or rings of the coil. In other embodiments, the piping 710 may be arranged with a different configuration. In still other embodiments, the piping 710 may be arranged around an outer wall of the storage tank, or between inner and outer walls. In other embodiments, the piping 710 may be arranged above or beneath the storage tank, or generally at or near a first end of the storage tank, for example. Still other piping configurations may be employed.

In some embodiments, one or more temperature sensors may be configured to detect a temperature related to the heating subsystem. For example, a temperature sensor 712 may be arranged on or in the storage tank 700. The temperature sensor 712 may be configured to detect a temperature of the water or other material within the storage tank 700. In this way, the temperature sensor 712 may help to determine when the water or other material stored within the storage tank 700 has reached a desired temperature or temperature range. In some embodiments, more than one temperature sensor may be arranged within or near the storage tank 700, such that temperature within the tank may be determined at multiple locations. In still other embodiments, other or additional temperature sensors may be arranged with different configurations. The temperature sensor 712 may be wired or wireless. In some embodiments, a transmitter 714 may be configured to send sensed temperature data to a controller.

With reference back to the system 600 of FIG. 6, in some embodiments, a control valve 608 may be used to operably direct heated fluid from the fluid heating device 602 to the hot water tank 606 as desired or needed. For example, the control valve 608 may have a first position, which may close off or limit flow to the heating subsystem 604. With the valve 608 in the first position, heated fluid of the fluid heating device 602 may be recirculated back through the fluid heating device for continued heating or reheating. Additionally, the control valve 608 may have a second position, which may open flow to the heating subsystem 604. With the valve 608 in the open position, all or a portion of heated fluid from the fluid heating device 602 may be directed to the heating subsystem 604 to heat a storage tank or other enclosure, space, or object.

Figure 9:
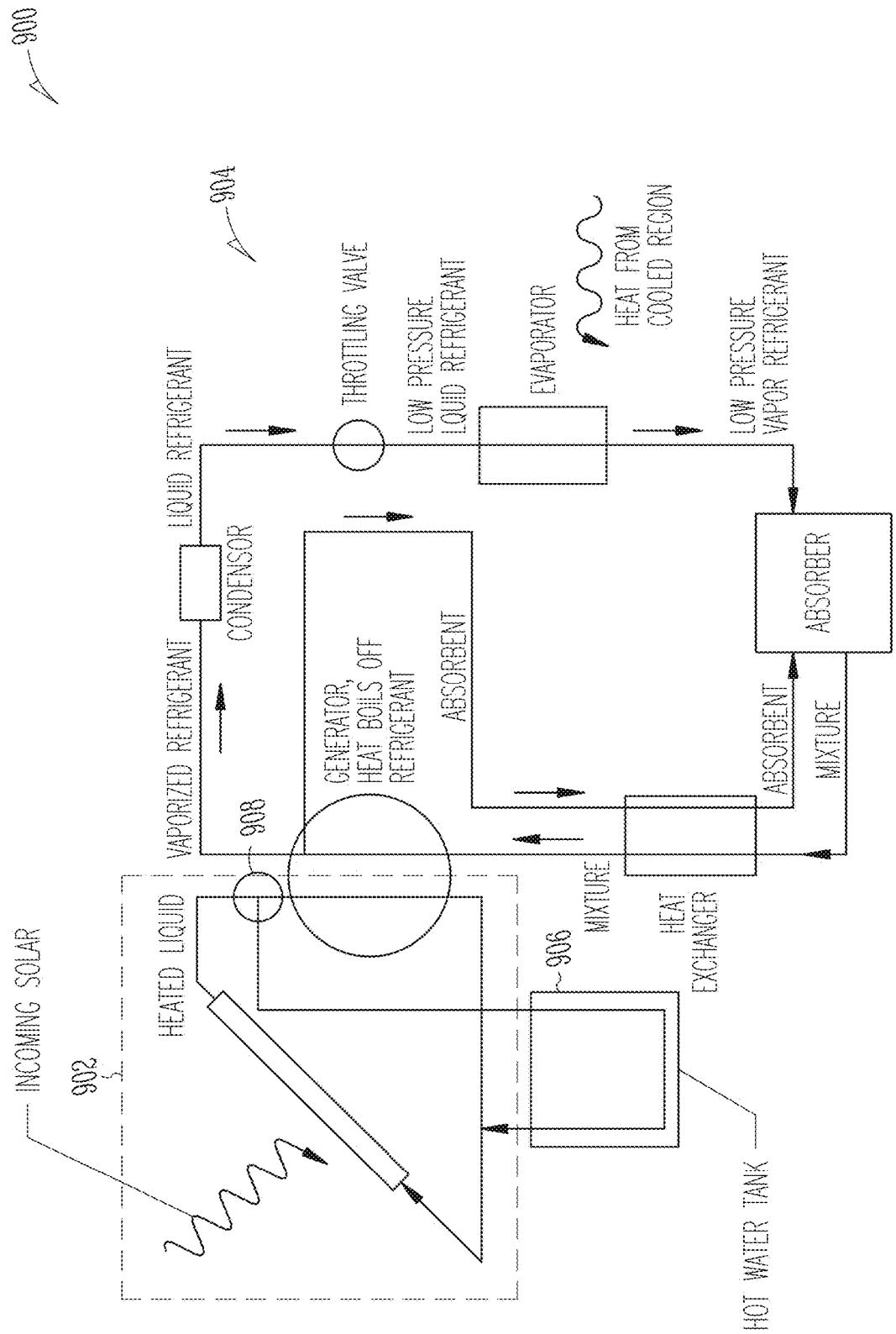
FIG. 9 is a conceptual diagram of a thermal system having a fluid heating device, heating subsystem, and cooling subsystem of the present disclosure, according to one or more embodiments.

In some embodiments, a system of the present disclosure may have one or more cooling subsystems and/or one or more heating subsystems. Turning for example to FIG. 9, a system 900 having a fluid heating device 902, cooling subsystem 904, and heating subsystem 906 is shown. Each of the subsystems 902, 904, 906 may be similar to those discussed above. In some embodiments, a control valve 908 may be configured to direct heated fluid from the fluid heating device 902 to each of the cooling subsystem 904 and the heating subsystem 906. For example, the control valve 908 may have a first position, which may direct heated fluid from the fluid heating device 902 to the cooling subsystem 904, and a second position which may direct heated fluid from the fluid heating device to the heating subsystem 906. In some embodiments, the control valve 908 may operably direct heated fluid from the fluid heating device 902 to each of the cooling subsystem 904 and heating subsystem 906 simultaneously. As the heated fluid leaves each of the cooling subsystem 904 and heating subsystem 906, it may be circulated back to the fluid heating device 902 for reheating.

Figure 10:
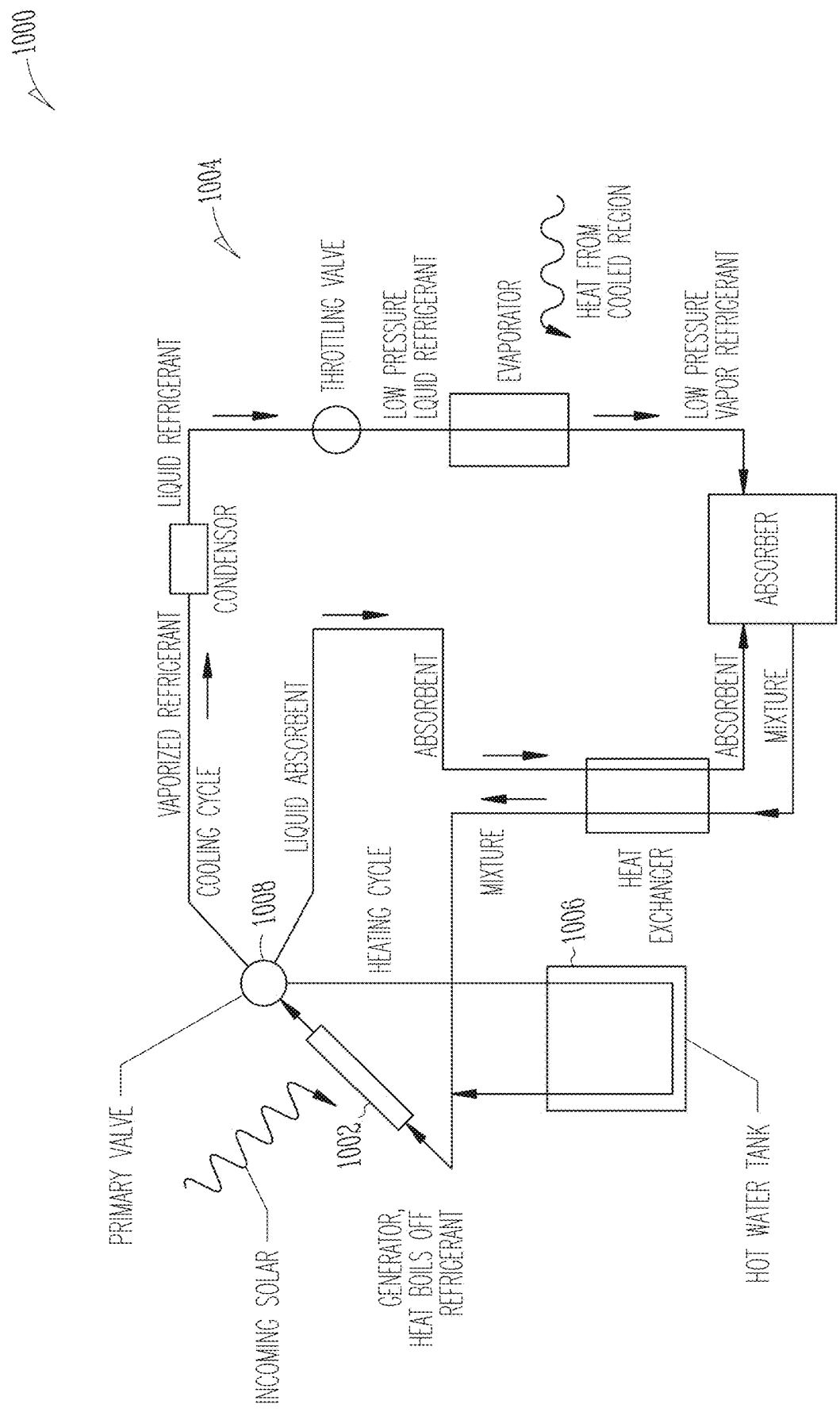
FIG. 10 is a conceptual diagram of another thermal system having a fluid heating device, heating subsystem, and cooling subsystem of the present disclosure, according to one or more embodiments.

Additionally, as described above with respect to FIG. 5, in some embodiments, a fluid heating device may operate as, or in place of, a generator for a cooling subsystem. In this regard, FIG. 10 shows system 1000 having a fluid heating device 1002, cooling subsystem 1004, and heating subsystem 1006, wherein the fluid heating device is integrally incorporated as a generator of the cooling subsystem. In this way, a refrigerant fluid in combination with an absorber fluid may be heated by cycling through the heated fluid subsystem 1002. A control valve 1008 may operably direct heated fluid to the cooling subsystem 1004 and/or to the heating subsystem 1006. In some embodiments, heated fluid directed to the heating subsystem 1006 may include the absorber, or may include the absorber-refrigerant mixture.

Figure 11:
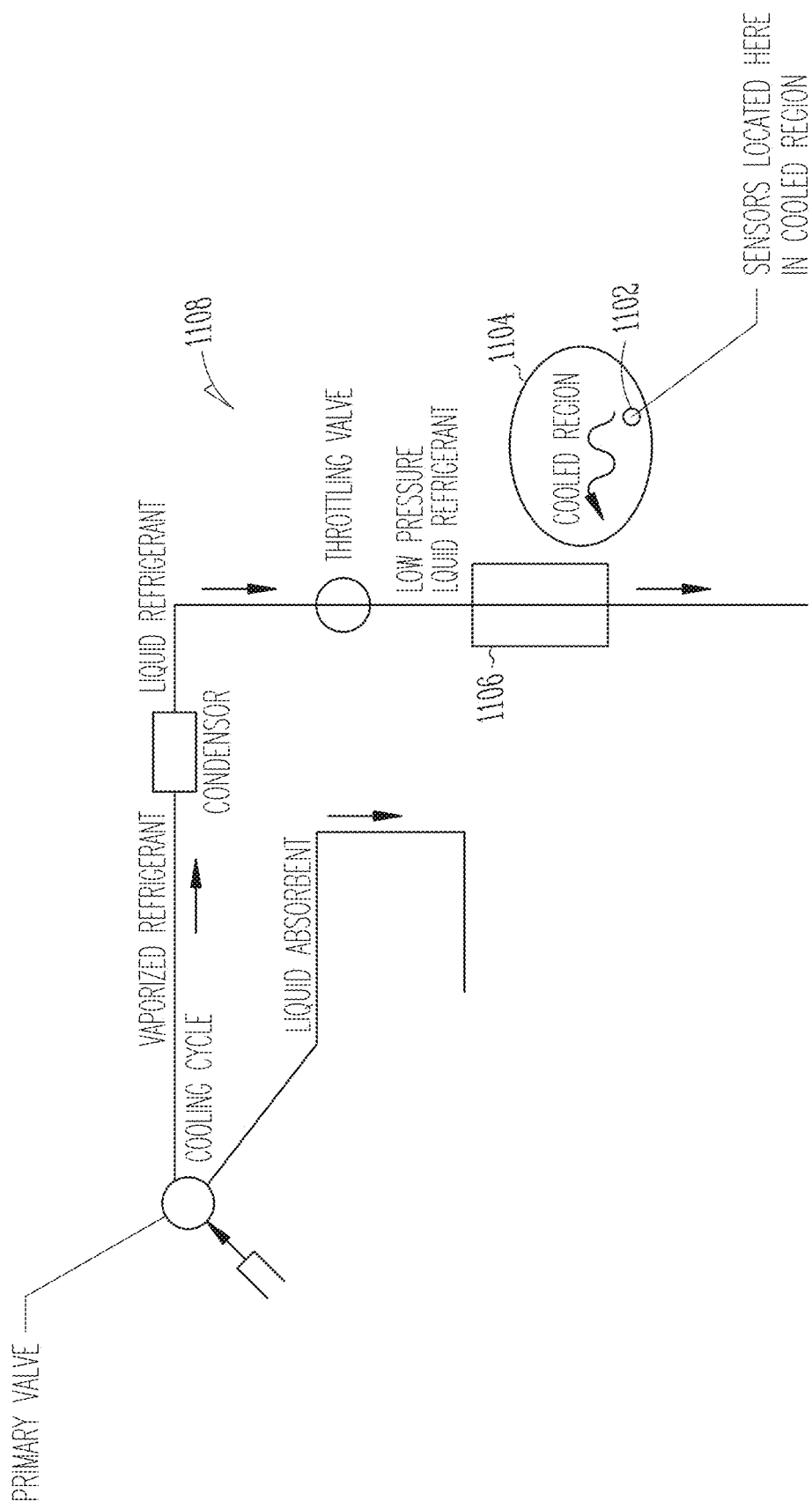
FIG. 11 is a conceptual diagram of a cooling subsystem of the present disclosure, according to one or more embodiments.

As described above, one or more temperature sensors may be configured to sense a temperature related to the heating subsystem. Additionally, one or more temperature sensors may be configured to sense a temperature related to the cooling subsystem. For example, as shown in FIG. 11, a temperature sensor 1102 may be arranged within a region or enclosure 1104 cooled by vaporizing refrigerant in the evaporator 1106 of a cooling subsystem 1108. The temperature sensor 1102 may be a wired or wireless sensor. In some embodiments, a transmitter, as described with respect to FIG. 6, may be configured to send sensed temperature data to a controller. Additionally, temperature sensors may be arranged at other locations throughout the heating and/or cooling subsystems. For example, a temperature sensor may configured to sense heated fluid temperature as it exits the fluid heating device, before or after entering a thermal subsystem. Other sensors may be configured to sense the temperature of a refrigerant fluid and/or absorbent fluid within a cooling subsystem. For example, a temperature sensor may be configured to determine refrigerant fluid temperature as the refrigerant enters an absorber. Another temperature sensor may be configured to measure refrigerant-absorber temperature as the mixture leaves the absorber. Other temperature sensors may be arranged at suitable locations throughout a cooling and/or heating subsystem. Additionally, other sensors, such as flow sensors or pressure sensors may be arranged at suitable locations throughout a system of the present disclosures. Flow and/or pressure sensors arranged at any of the above-described locations or other locations throughout the system may provide for additional monitoring and control of the system.

Figure 12:
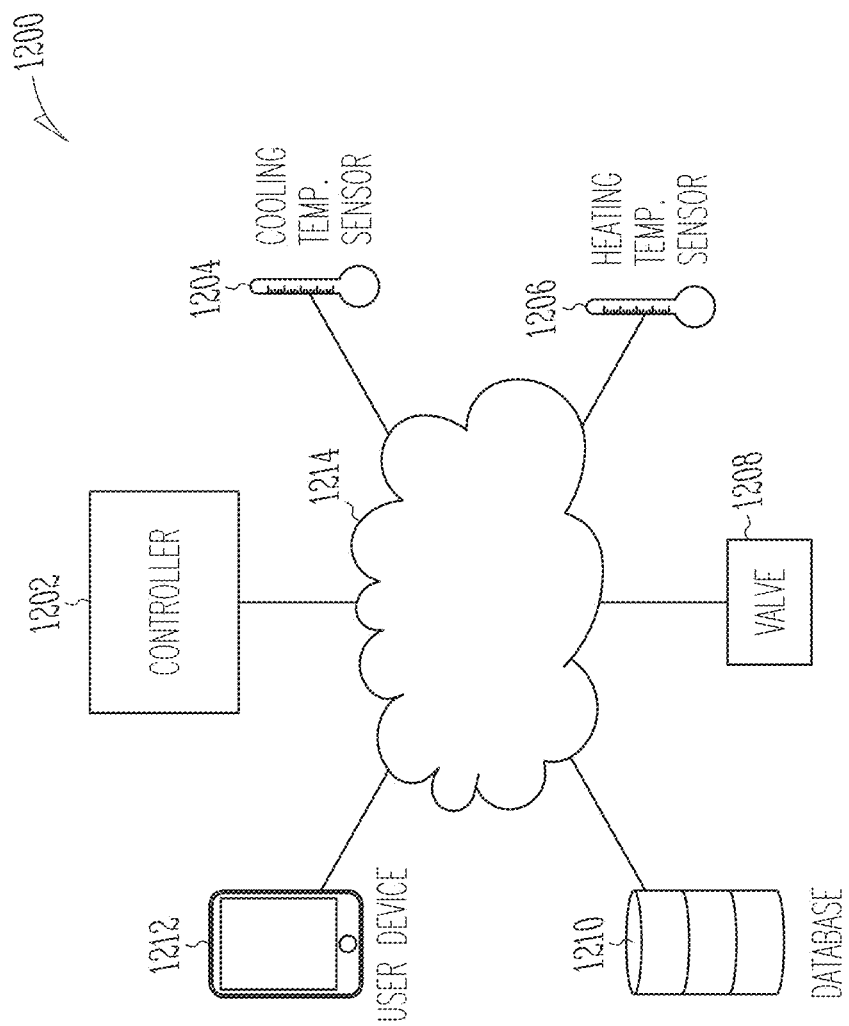
FIG. 12 is a conceptual diagram of a thermal control system of the present disclosure, according to one or more embodiments.

Systems of the present disclosure may generally be configured to operate heating and/or cooling operations as needed or desired. Control of such heating and cooling operations may be based upon sensed conditions, predetermined settings, and/or user inputs. In some embodiments, a controller, processor, or other computing device may be configured for monitoring and/or controlling heating and cooling system operations. Turning now to FIG. 12, a heating and cooling control system 1200 of the present disclosure is shown, according to one or more embodiments. The system 1200 may generally include a controller 1202, a cooling subsystem temperature sensor 1204, a heating subsystem temperature sensor 1206, a control valve 1208, a database 1210, and a user device 1212. The various devices of the system 1200 may communicate over a wired or wireless network 1214.

The valve 1208 may be a valve similar to those discussed above with respect to FIGS. 9 and 10. The valve 1208 may configured to direct heated fluid from a fluid heating device to a cooling subsystem and/or a heating subsystem. The valve 1208 may be an electromechanical valve in some embodiments. In some embodiments, the system 1200 may have more than one valve 1208. For example, a first valve may control flow to a cooling subsystem and a second valve may control flow to a heating subsystem. In still other embodiments, multiple valves may be arranged at different points throughout the fluid heating device, cooling subsystem, and heating subsystem. In addition or alternative to the valve 1208, in some embodiments, the system 1200 may have one or more pumps, such as for directing heated fluid from the fluid heating device to the cooling and/or heating subsystems. Pumps may be used to direct the fluid to or through a desired path of circulation. The pump(s) may be used in combination with the one or more valves in some embodiments. In other embodiments, the pump(s) may be used without the need for a valve, such that flow may be directed by selectively operating the pump(s).

The temperature sensors 1204, 1206 may be configured to sense temperature conditions and transmit sensed temperature conditions to the controller 1202. For example, the cooling subsystem temperature sensor 1204 may be arranged within or proximate to a cooling subsystem, such as within or on an enclosure, region, or object cooled by refrigerant fluid of the cooling subsystem. In some embodiments, the system 1200 may have more than one cooling temperature sensor 1204 arranged within or on an area or object cooled by the subsystem. Similarly, the heating subsystem temperatures sensor 1206 may be arranged within or proximate to a heating subsystem, such as within or on an enclosure, region, or object heated by heated fluid passing through the heating subsystem. In some embodiments, the system 1200 may have more than one heating temperature sensor 1206 arranged within or on an area or object heated by the subsystem. In some embodiments, the system 1200 may have other sensors as well, such as flow sensors and pressure sensors for monitoring and/or controlling flow of the heated fluid and/or other fluids in the system. Temperature, flow, pressure, and/or other sensors may operate to sense and/or transmit sensed conditions continuously, intermittently, at intervals, or on demand.

The controller 1202 may include hardware and/or software for controlling the valve 1208 (and/or one or more fluid pumps) based upon sensed temperature conditions, predetermined settings, and/or user input. For example, the controller 1202 may be programmed or otherwise configured such that when a temperature sensor 1204, 1206 indicates that a temperature is outside of a desired or predetermined range, the controller may operate the valve 1208 to direct or redirect heated fluid from a fluid heating device. As a more particular example, it may be predetermined that an enclosure should be cooled, via the cooling subsystem, to a temperature of 60 degrees F. If the cooling subsystem temperature sensor 1204 indicates that a temperature within the enclosure rises above 60 degrees F., the controller 1202 may operate the valve 1208 to send heated fluid to the cooling subsystem so as to operate the cooling subsystem to lower the temperature of the enclosure. Once the temperature of the enclosure reaches or drops below the desired 60 degrees F., the controller 1202 may operate the valve 1208 to stop directing heated fluid to the cooling subsystem, or to redirect the heated fluid elsewhere, such as to another subsystem. As another particular example, it may be predetermined that an enclosure should be heated, via the heating subsystem, to a temperature of 90 degrees F. If the heating subsystem temperature sensor 1206 indicates that a temperature within the enclosure drops below 90 degrees F., the controller 1202 may operate the valve 1208 to send heated fluid to the heating subsystem so as to raise the temperature of the enclosure. Once the temperature of the enclosure reaches or exceeds the desired 90 degrees F., the controller 1202 may operate the valve 1208 to stop directed heated fluid to the heating subsystem, or to redirect the heated fluid elsewhere. The controller 1202 may be arranged onboard the fluid heating device in some embodiments. In other embodiments, the controller 1202 may be arranged remotely.

In some embodiments, the controller 1202 may be the same controller(s) that operates the fluid heating device. That is, as described above with respect to FIG. 2, one or more controllers may operate the fluid heating device by tracking and directing the solar collection system toward the sun, and controlling flow of fluid through the device to heat the fluid as needed.

In some embodiments, the controller 1202 may be operated by, or at least in part by, user input. For example, a user may set desired temperatures or temperature ranges for the heating and/or cooling subsystems. In some embodiments, a user may set or change a desired temperature or range on demand to operate the valve 1208 in substantially real time or near real time.

The user device 1212 may provide a user interface through which a user may interact with the system 1200. For example, the user device 1212 may be configured to receive user inputs for controlling the valve 1208. Additionally, the user device 1212 may allow a user to access current or historical sensed data, current or historical valve operations or positions, and/or current or historical temperature settings or other user inputs. The user device 1212 may be or include a desktop, notebook, or tablet computer in some embodiments. In other embodiments, the user device 1212 may be or include a smartphone or other digital device. The user device 1212 may provide a user interface, which may include one or more software programs or applications stored on the user device. Alternatively, a user interface may be provided through one or more websites accessible over a network, such as an Internet network. In some embodiments, multiple user devices 1212 may be used to operate or access the system 1200.

The database 1210 may include one or more local or remote data storage devices. The database 1210 may be configured to store historical sensed data. Additionally, the database 1210 may be configured to store instructions for controlling the valve 1208, such as user inputs of temperatures or temperature ranges for each subsystem. The database 1210 may additionally store data related to historical valve operations.

In use, systems and devices of the present disclosure may operate to provide self-contained heating and/or cooling operations. As described above, heated fluid from a fluid heating device may be directed to a heating subsystem, where the heated fluid may be directed through piping for heating an enclosure, environment, or object. Additionally or alternatively, heated fluid from a fluid heating device may be directed to a cooling subsystem, where heat from the heated fluid may be used to operate or initiate the cooling process. For example, heat from the heated fluid may be used to separate a refrigerant from an absorber by bringing the refrigerant to its boiling temperature. The cooling subsystem may operate to cool an enclosure, environment, or object. In some embodiments, a fluid heating device of the present disclosure may operate multiple heating subsystems and/or multiple cooling subsystems, such as for heating and/or cooling different enclosures. Once a user selects or sets a desired temperature or temperature range for each subsystem, the system may operate autonomously to direct heated fluid as needed to maintain the desired temperatures or ranges for each subsystem. In some embodiments, subsystems may be operated simultaneously, while in other embodiments, subsystems may be operated alternatively.

In some embodiments, a system of the present disclosure may prioritize some subsystems over other subsystems. For example, if a temperature within two subsystems falls outside of a desired temperature or range for each subsystem, the controller for the system may prioritize operation of one of the two subsystems over the other. Similarly, if there is not enough heated fluid to fulfill the needs of one or more subsystems, the controller may prioritize various operations. In some embodiments, prioritization of subsystems may be determined based on the amount of time and/or energy needed to maintain or reach a desired temperature or range for each subsystem. In some embodiments, a user may select or determine which subsystems are to be prioritized over others. As a particular example, where medicinal products are stored in a refrigerated enclosure, a user may specify that cooling operations for that refrigerated enclosure should be prioritized over other subsystem operations. In other embodiments, the system may determine, or a user may select, a portion of heated fluid that should be directed to operation of each subsystem. For example, a user may select that at least 50% of heated fluid should be directed to a particular subsystem, and remaining heated fluid should be divided between other subsystems. Flow, pressure, and temperature sensors may help to determine whether prioritization is needed at a particular time. In this way, user may designate a variety of rules for controlling the system. For example, where a particular temperature, pressure, and/or flow is measured, a user may designate that particular prioritization procedures are to be followed. Prioritization procedures or designations may be particularly beneficial where solar energy directed by a fluid heating device is interrupted. For example, at night or during periods of overcast or low-light conditions, there may be insufficient solar energy to meet the demands of the various thermal subsystems. Prioritization procedures may be used to help direct heated fluid where it is most needed or where it may be most beneficial.

It is to be appreciated that a system of the present disclosure may allow for temperature control of the heated fluid used to operate the various thermal subsystems. In some embodiments, some thermal subsystems may require, or benefit from, fluid that is heated to a particular temperature or range, while other subsystems may require or benefit from fluid that is heated to a different temperature or range. Thus, the fluid heating device may be operated to control the temperature of heated fluid directed to each thermal subsystem. This control may be performed through the use of one or more valves, such as temperature controlled or digitally controlled valves, arranged along the flow path of the fluid heating device. Such temperature controlled valving is additionally described in U.S. Non-Provisional application Ser. No. 14/954,318, entitled Control Valve Assembly for a Fluid Heating System, and previously incorporated herein by reference. Additionally the controller may be configured to direct the solar heating device away from the sun once a particular temperature is reached or neared. Through the use of temperature controlled or digitally controlled valves, and the ability to redirect the fluid heating device as needed, the temperature of fluid exiting the fluid heating device may be optimized for different thermal subsystems.

In some embodiments, one or more subsystems may have a threshold temperature, below which heated fluid provided by the fluid heating device may be ineffective. For example, for a cooling subsystem, the threshold temperature may be a boiling temperature of a refrigerant circulating through the cooling subsystem. In order to vaporize the refrigerant, heated fluid provided to power the cooling subsystem may need reach at least that threshold temperature. Thus, if it is determined that heated fluid exiting the fluid heating device is below this threshold temperature, the fluid may be directed away from the cooling subsystem, and redirected where it may be used more efficiently or effectively. In this way, the threshold temperature of a cooling subsystem may be determined based on the particular refrigerant(s) or other fluids circulated within the cooling subsystem.

Similarly, for a heating subsystem, such as a storage tank described above with respect to FIGS. 7 and 8, the threshold temperature may be determined based upon a current temperature within the storage tank. For example, if a current temperature within the storage tank is below a temperature of heated fluid exiting the fluid heating device, the fluid exiting the fluid heating device may be suitable for heating material in the storage tank. That is, at any given time, a threshold temperature for the heating subsystem may be a temperature above the current temperature of the heating subsystem. If it is determined that heated fluid exiting the fluid heating device is at or below a current temperature of the heating subsystem, the fluid may be directed away from the heating subsystem, and redirected where it may be used more efficiently or effectively.

A system of the present disclosure may operate automatically to monitor threshold temperatures and fluid heating device temperatures to determine where to efficiently or effectively direct heated fluid. This may be particularly beneficial where fluid heating is interrupted or limited (i.e., by periods of low or no sunlight).

In some embodiments, a system of the present disclosure may incorporate one or more heating sources in addition to, or alternative to, a fluid heating device. For example, an electric heating device may allow the system to operate at night, during a cloudy day, or when the fluid heating device described above is otherwise unable to collect sufficient solar energy to meet the needs of the system. In some embodiments, a solar electric device may be used to collect solar energy, which may be stored as electric energy to power a heater and/or other components of the system. Such additional heating sources may be particularly beneficial to continue powering a system of the present disclosure when there is insufficient sunlight present to meet fluid heating demands of the system, such as at night, on overcast days, or during times of peak demand.

Figure 13:
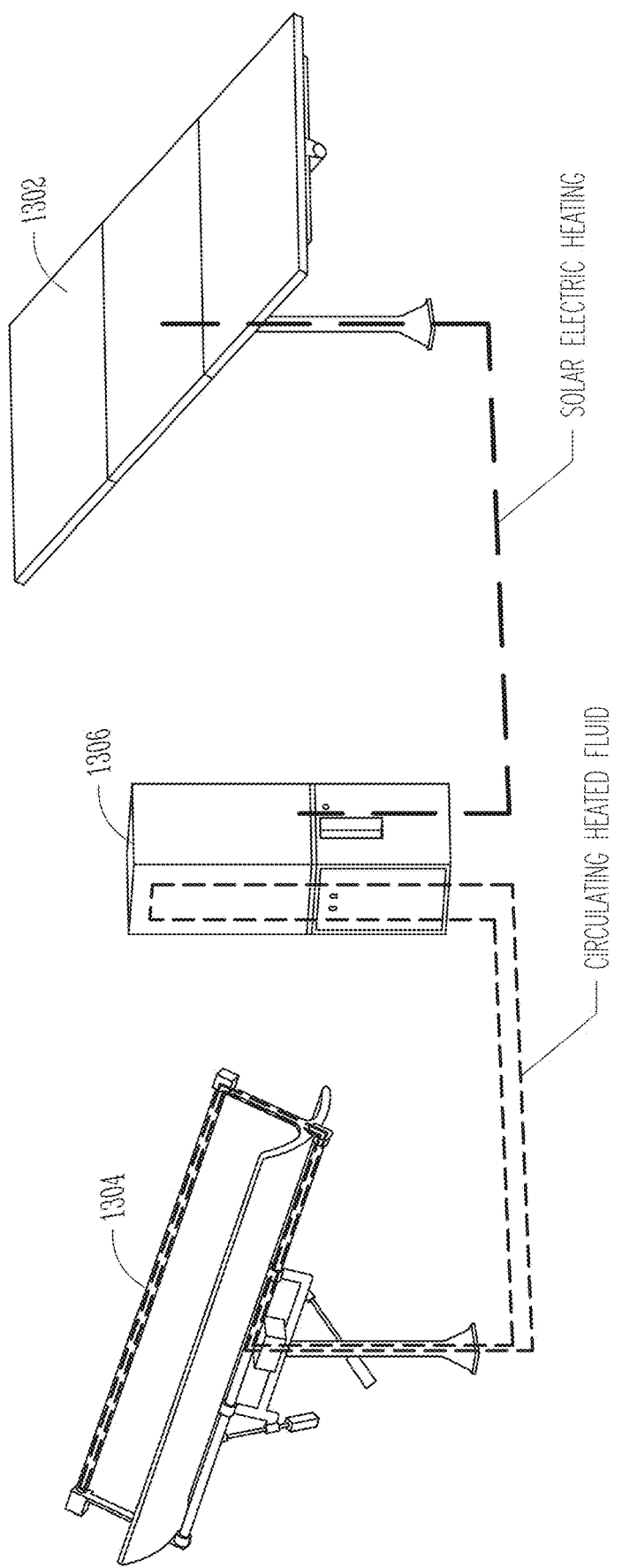
FIG. 13 is a conceptual diagram of a thermal system of the present disclosure, having a fluid heating device and a solar electric device, according to one or more embodiments.

Turning for example to FIG. 13, a solar electric device 1302 is shown in combination with a fluid heating device 1304 for providing heat to power one or more thermal subsystems 1306. The solar electric device 1304 may collect solar energy through one or more solar panels. The collected solar energy may be stored, such as in one or more batteries. When needed, the stored battery power may then be used to power a heater, such as a resistance heater, to heat, or assist in heating, system fluid. As a particular example, the solar electric device 1302 may collect and store solar energy during the daytime, while the fluid heating device 1304 operates to provide a heated fluid to the one or more thermal subsystems 1306. At night, or when there otherwise is insufficient sunlight to heat the circulated fluid to one or more threshold temperatures, stored energy collected by the solar electric device 1302 may be used to provide heated fluid to the one or more thermal subsystems 1306 via an electric heater. As another example, collected and/or stored energy from the solar electric device 1302 may be used to supplement heating during time of peak demand. Additionally, in some embodiments, energy collected and/or stored by the solar electric device 1302 may be used to power other components of the system. For example, stored battery power may be used to power other electrical and electromechanical components of the system, such as a controller, digital valves, pumps, and/or other components discussed above with respect to FIG. 12.

It is to be appreciated that a system of the present disclosure may be capable of, and/or particularly configured for, off-grid or micro-grid use. In this way, the systems described herein may be self-sustaining without the need for an electric power grid or other outside energy source. For example, and as described above, heated fluid circulated to cooling and/or heating subsystems may be heated through solar energy directed by a solar heating device. Additionally, a solar electric device may be used to power an electric heater for supplemental or alternative heat as needed. A solar electric device may additionally be used to power other system components and controls. This off-grid or micro-grid operation may be particularly beneficial in remote areas of the world or in conditions of power loss, catastrophic event, war, or other situations where other energy sources may be relatively unavailable or inaccessible.

Figure 14:
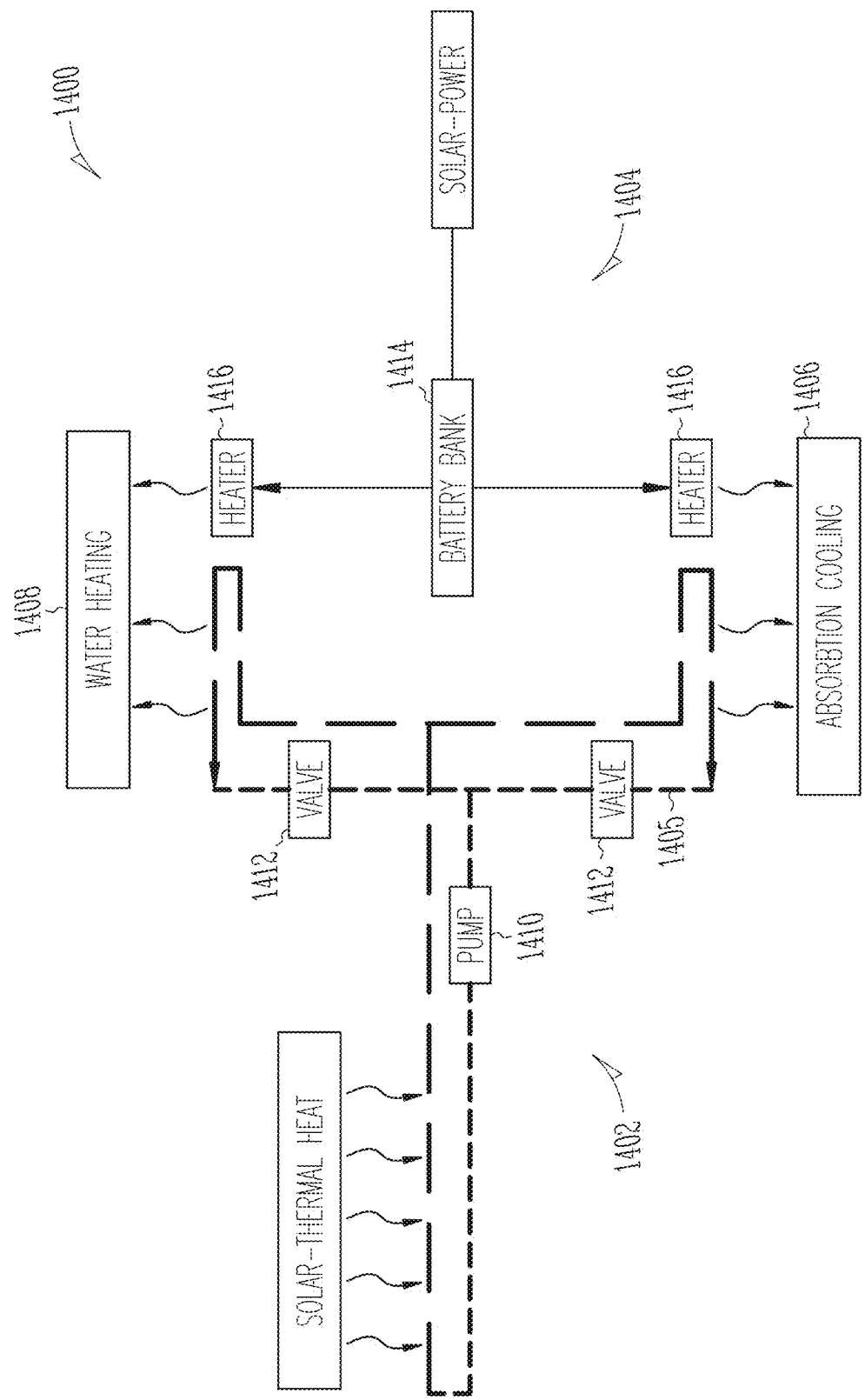
FIG. 14 is a conceptual diagram of another thermal system of the present disclosure, having a fluid heating device and a solar electric device, according to one or more embodiments.

For example, FIG. 14 shows one embodiment of a system 1400 wherein a fluid heating device 1402 and a solar electric device 1404 are used in combination to power one or more thermal subsystems, such as a cooling subsystem 1406 and a heating subsystem 1408. The fluid heating device 1402 may use solar thermal heat to heat a fluid 1405, as described above. Using one or more pumps 1410 and one or more valves 1412, the fluid heating device 1402 may circulate the fluid 1405 to operably power each of the thermal subsystems 1406, 1408. Additionally, the solar electric device 1404 may collect and store solar power in a battery bank 1414. When needed, the energy stored in the battery bank 1414 may be used to add additional heat to the circulating fluid 1405 via one or more heaters 1416. As described above, energy collected by the solar electric device 1404 may additionally or alternatively be used to power other electrical components of the system, including a controller, valves, pumps, and/or other components. Moreover, where the cooling subsystem 1406 comprises a compression-based cooling system, energy collected by the solar electric device 1404 and/or stored in the battery bank 1414 may be used to power a compressor.

Figure 15:
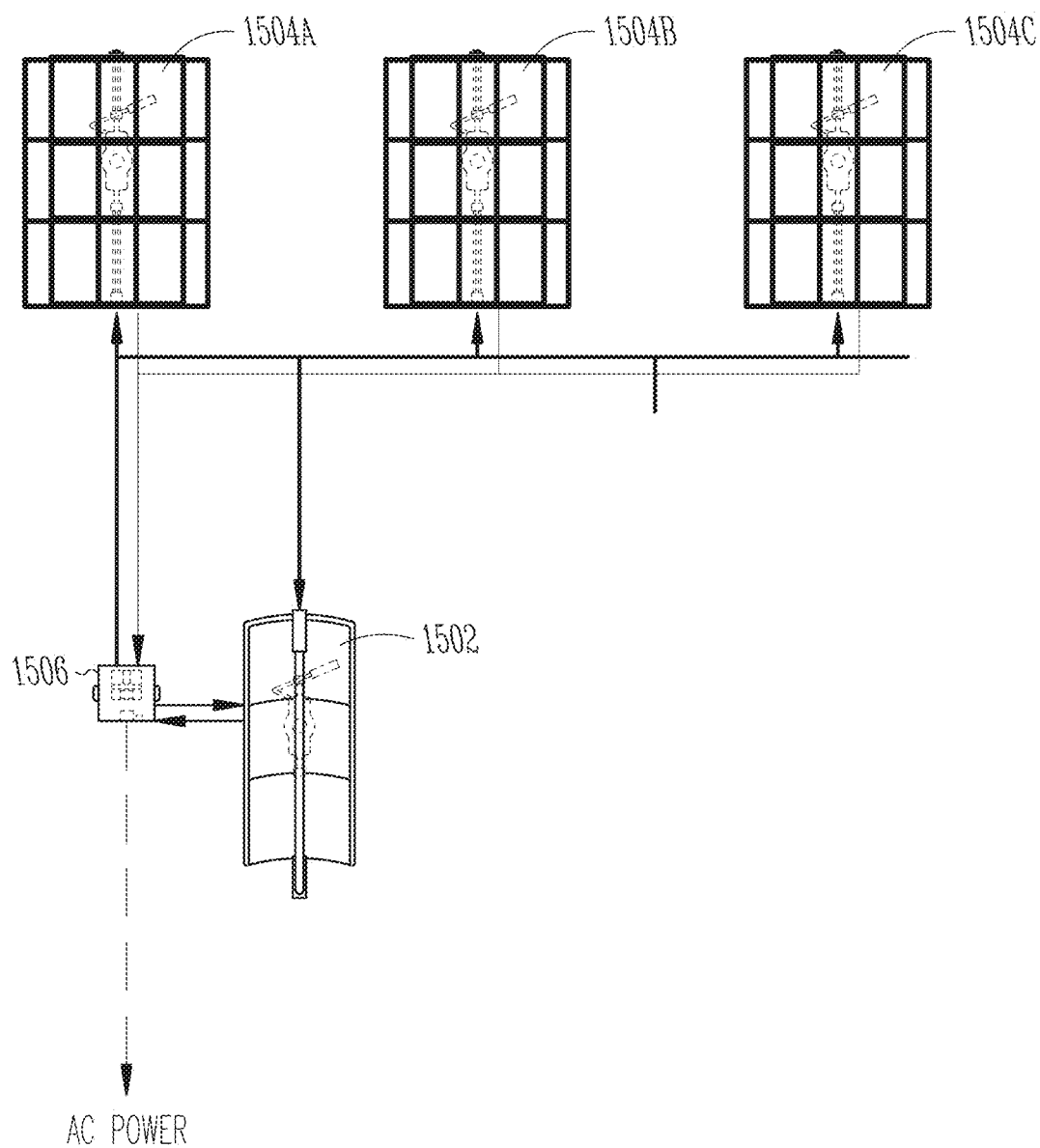
FIG. 15 is a conceptual diagram of a thermal system of the present disclosure, having a fluid heating device and three solar electric devices, according to one or more embodiments.

FIG. 15 illustrates an example of a system 1500 wherein a fluid heating device 1502 and three solar electric devices 1504a, 1504b, 1504c are used in combination to power one or more thermal subsystems 1506. It is to be appreciated that more or fewer fluid heating devices 1502, solar electric devices 1504, and/or other heating devices or energy devices may be added.

For purposes of this disclosure, any system described herein may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, a system or any portion thereof may be a minicomputer, mainframe computer, personal computer (e.g., desktop or laptop), tablet computer, embedded computer, mobile device (e.g., personal digital assistant (PDA) or smart phone) or other hand-held computing device, server (e.g., blade server or rack server), a network storage device, or any other suitable device or combination of devices and may vary in size, shape, performance, functionality, and price. A system may include volatile memory (e.g., random access memory (RAM)), one or more processing resources such as a central processing unit (CPU) or hardware or software control logic, ROM, and/or other types of nonvolatile memory (e.g., EPROM, EEPROM, etc.). A basic input/output system (BIOS) can be stored in the non-volatile memory (e.g., ROM), and may include basic routines facilitating communication of data and signals between components within the system. The volatile memory may additionally include a high-speed RAM, such as static RAM for caching data.

Additional components of a system may include one or more disk drives or one or more mass storage devices, one or more network ports for communicating with external devices as well as various input and output (I/O) devices, such as digital and analog general purpose I/O, a keyboard, a mouse, touchscreen and/or a video display. Mass storage devices may include, but are not limited to, a hard disk drive, floppy disk drive, CD-ROM drive, smart drive, flash drive, or other types of non-volatile data storage, a plurality of storage devices, a storage subsystem, or any combination of storage devices. A storage interface may be provided for interfacing with mass storage devices, for example, a storage subsystem. The storage interface may include any suitable interface technology, such as EIDE, ATA, SATA, and IEEE 1394. A system may include what is referred to as a user interface for interacting with the system, which may generally include a display, mouse or other cursor control device, keyboard, button, touchpad, touch screen, stylus, remote control (such as an infrared remote control), microphone, camera, video recorder, gesture systems (e.g., eye movement, head movement, etc.), speaker, LED, light, joystick, game pad, switch, buzzer, bell, and/or other user input/output device for communicating with one or more users or for entering information into the system. These and other devices for interacting with the system may be connected to the system through I/O device interface(s) via a system bus, but can be connected by other interfaces such as a parallel port, IEEE 1394 serial port, a game port, a USB port, an IR interface, etc. Output devices may include any type of device for presenting information to a user, including but not limited to, a computer monitor, flat-screen display, or other visual display, a printer, and/or speakers or any other device for providing information in audio form, such as a telephone, a plurality of output devices, or any combination of output devices.

A system may also include one or more buses operable to transmit communications between the various hardware components. A system bus may be any of several types of bus structure that can further interconnect, for example, to a memory bus (with or without a memory controller) and/or a peripheral bus (e.g., PCI, PCIe, AGP, LPC, I2C, SPI, USB, etc.) using any of a variety of commercially available bus architectures.

One or more programs or applications, such as a web browser and/or other executable applications, may be stored in one or more of the system data storage devices. Generally, programs may include routines, methods, data structures, other software components, etc., that perform particular tasks or implement particular abstract data types. Programs or applications may be loaded in part or in whole into a main memory or processor during execution by the processor. One or more processors may execute applications or programs to run systems or methods of the present disclosure, or portions thereof, stored as executable programs or program code in the memory, or received from the Internet or other network. Any commercial or freeware web browser or other application capable of retrieving content from a network and displaying pages or screens may be used. In some embodiments, a customized application may be used to access, display, and update information. A user may interact with the system, programs, and data stored thereon or accessible thereto using any one or more of the input and output devices described above.

A system of the present disclosure can operate in a networked environment using logical connections via a wired and/or wireless communications subsystem to one or more networks and/or other computers. Other computers can include, but are not limited to, workstations, servers, routers, personal computers, microprocessor-based entertainment appliances, peer devices, or other common network nodes, and may generally include many or all of the elements described above. Logical connections may include wired and/or wireless connectivity to a local area network (LAN), a wide area network (WAN), hotspot, a global communications network, such as the Internet, and so on. The system may be operable to communicate with wired and/or wireless devices or other processing entities using, for example, radio technologies, such as the IEEE 802.xx family of standards, and includes at least Wi-Fi (wireless fidelity), WiMax, and Bluetooth wireless technologies. Communications can be made via a predefined structure as with a conventional network or via an ad hoc communication between at least two devices.

Hardware and software components of the present disclosure, as discussed herein, may be integral portions of a single computer, server, controller, or message sign, or may be connected parts of a computer network. The hardware and software components may be located within a single location or, in other embodiments, portions of the hardware and software components may be divided among a plurality of locations and connected directly or through a global computer information network, such as the Internet. Accordingly, aspects of the various embodiments of the present disclosure can be practiced in distributed computing environments where certain tasks are performed by remote processing devices that are linked through a communications network. In such a distributed computing environment, program modules may be located in local and/or remote storage and/or memory systems.

As will be appreciated by one of skill in the art, the various embodiments of the present disclosure may be embodied as a method (including, for example, a computer-implemented process, a business process, and/or any other process), apparatus (including, for example, a system, machine, device, computer program product, and/or the like), or a combination of the foregoing. Accordingly, embodiments of the present disclosure may take the form of an entirely hardware embodiment, an entirely software embodiment (including firmware, middleware, microcode, hardware description languages, etc.), or an embodiment combining software and hardware aspects. Furthermore, embodiments of the present disclosure may take the form of a computer program product on a computer-readable medium or computer-readable storage medium, having computer-executable program code embodied in the medium, that define processes or methods described herein. A processor or processors may perform the necessary tasks defined by the computer-executable program code. Computer-executable program code for carrying out operations of embodiments of the present disclosure may be written in an object oriented, scripted or unscripted programming language such as Java, Perl, PHP, Visual Basic, Smalltalk, C++, or the like. However, the computer program code for carrying out operations of embodiments of the present disclosure may also be written in conventional procedural programming languages, such as the C programming language or similar programming languages. A code segment may represent a procedure, a function, a subprogram, a program, a routine, a subroutine, a module, an object, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

In the context of this document, a computer readable medium may be any medium that can contain, store, communicate, or transport the program for use by or in connection with the systems disclosed herein. The computer-executable program code may be transmitted using any appropriate medium, including but not limited to the Internet, optical fiber cable, radio frequency (RF) signals or other wireless signals, or other mediums. The computer readable medium may be, for example but is not limited to, an electronic, magnetic, optical, electromagnetic, infrared, or semiconductor system, apparatus, or device. More specific examples of suitable computer readable medium include, but are not limited to, an electrical connection having one or more wires or a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device. Computer-readable media includes, but is not to be confused with, computer-readable storage medium, which is intended to cover all physical, non-transitory, or similar embodiments of computer-readable media.

Various embodiments of the present disclosure may be described herein with reference to flowchart illustrations and/or block diagrams of methods, apparatus (systems), and computer program products. It is understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks. Alternatively, computer program implemented steps or acts may be combined with operator or human implemented steps or acts in order to carry out an embodiment of the invention.

Additionally, although a flowchart or block diagram may illustrate a method as comprising sequential steps or a process as having a particular order of operations, many of the steps or operations in the flowchart(s) or block diagram (s) illustrated herein can be performed in parallel or concurrently, and the flowchart(s) or block diagram(s) should be read in the context of the various embodiments of the present disclosure. In addition, the order of the method steps or process operations illustrated in a flowchart or block diagram may be rearranged for some embodiments. Similarly, a method or process illustrated in a flow chart or block diagram could have additional steps or operations not included therein or fewer steps or operations than those shown. Moreover, a method step may correspond to a method, a function, a procedure, a subroutine, a subprogram, etc.

As used herein, the terms "substantially" or "generally" refer to the complete or nearly complete extent or degree of an action, characteristic, property, state, structure, item, or result. For example, an object that is "substantially" or "generally" enclosed would mean that the object is either completely enclosed or nearly completely enclosed. The exact allowable degree of deviation from absolute completeness may in some cases depend on the specific context. However, generally speaking, the nearness of completion will be so as to have generally the same overall result as if absolute and total completion were obtained. The use of "substantially" or "generally" is equally applicable when used in a negative connotation to refer to the complete or near complete lack of an action, characteristic, property, state, structure, item, or result. For example, an element, combination, embodiment, or composition that is "substantially free of" or "generally free of" an element may still actually contain such element as long as there is generally no significant effect thereof.

In the foregoing description various embodiments of the present disclosure have been presented for the purpose of illustration and description. They are not intended to be exhaustive or to limit the invention to the precise form disclosed. Obvious modifications or variations are possible in light of the above teachings. The various embodiments were chosen and described to provide the best illustration of the principals of the disclosure and their practical application, and to enable one of ordinary skill in the art to utilize the various embodiments with various modifications as are suited to the particular use contemplated. All such modifications and variations are within the scope of the present disclosure as determined by the appended claims when interpreted in accordance with the breadth they are fairly, legally, and equitably entitled.

What is claimed is:
1. A thermal fluid system comprising:
a fluid heating device configured for rotation about dual axes and configured to heat a fluid circulated therethrough the fluid heating device comprising:
a support structure;
an upright support member;
an arm portion extending laterally from the upright support member; and
a spine portion offset from the arm portion and extending substantially parallel to the arm portion, wherein the arm portion is pivotable about a season axis extending perpendicular to the upright support member and perpendicular to the arm portion and the spine portion is pivotable about a day axis extending longitudinally along the spine portion;
a continuous and uninterrupted reflective surface configured to focus sunlight from a sun on a focal axis centered above the reflective surface, the continuous and uninterrupted reflective surface being arranged on a frame supported by the spine;
a pair of upright support elements each extending upward from the frame at respective ends of the continuous and uninterrupted reflective surface; and
a fluid heating element comprising no more than a single tube secured to and extending between the pair of upright support elements and arranged along the focal axis;
at least one of:
a heating subsystem configured to heat an enclosure or material by circulation of heated fluid from the fluid heating device through the heating subsystem; or a cooling subsystem configured to provide refrigeration, wherein at least a portion of the cooling subsystem is powered by heated fluid from the fluid heating device;
a controller configured to control the position of the fluid heating device relative to the sun;
a sensor configured for sensing the temperature of the fluid heating element;
a temperature sensor configured for sensing a temperature of the heating subsystem or the cooling subsystem, the temperature sensor being in wireless communication with the controller; and
a control valve operable by the controller to control the flow of fluid to the heating subsystem or the cooling subsystem.

2. The thermal fluid system of claim 1, wherein the cooling subsystem comprises an absorption cooling system.

3. The thermal fluid system of claim 2, wherein the cooling subsystem comprises a refrigerant-absorbent fluid mixture, and a generator configured for separating the refrigerant from the absorbent.

4. The thermal fluid system of claim 3, wherein the generator comprises the fluid heating device, and wherein fluid circulated through the fluid heating device comprises the refrigerant-absorbent fluid mixture.

5. The thermal fluid system of claim 1, wherein the heating subsystem comprises a storage tank.

6. The thermal fluid system of claim 5, wherein the heating subsystem comprises a pipe configured to carry heated fluid from the fluid heating device through the storage tank to heat the interior of the storage tank.

7. The thermal fluid system of claim 1, further comprising a solar electric device configured to collect and store solar energy.

8. The thermal fluid system of claim 7, further comprising an electric heating device operable by stored solar energy.

* * * * *